United States Patent
Kohara et al.

(10) Patent No.: US 9,831,686 B2
(45) Date of Patent: Nov. 28, 2017

(54) WIRELESS POWER TRANSMISSION DEVICE

(71) Applicant: Panasonic Intellectual Property Management Co., Ltd., Osaka (JP)

(72) Inventors: Hiroshi Kohara, Aichi (JP); Mamoru Ozaki, Osaka (JP); Toyohiko Tsujimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 14/770,598

(22) PCT Filed: Feb. 27, 2014

(86) PCT No.: PCT/JP2014/001048
§ 371 (c)(1),
(2) Date: Aug. 26, 2015

(87) PCT Pub. No.: WO2014/136404
PCT Pub. Date: Sep. 12, 2014

(65) Prior Publication Data
US 2016/0013658 A1    Jan. 14, 2016

(30) Foreign Application Priority Data
Mar. 5, 2013 (JP) ................. 2013-043322

(51) Int. Cl.
*H01F 27/42* (2006.01)
*H02J 5/00* (2016.01)
(Continued)

(52) U.S. Cl.
CPC .............. *H02J 5/005* (2013.01); *H02J 7/025* (2013.01); *H02J 50/12* (2016.02); *H02J 50/40* (2016.02); *H02J 50/90* (2016.02)

(58) Field of Classification Search
CPC .. H02J 50/90; H02J 50/12; H02J 50/40; H02J 7/025; H02J 5/005
(Continued)

(56) References Cited

U.S. PATENT DOCUMENTS

2008/0197713 A1* 8/2008 Jin .................. H02J 7/025
                                                         307/104
2009/0175060 A1    7/2009 Onishi et al.
(Continued)

FOREIGN PATENT DOCUMENTS

JP      2006-230129 A     8/2006
JP      2008-237007 A    10/2008
(Continued)

OTHER PUBLICATIONS

Extended European Search Report for corresponding European Application No. 14760208.0 dated Mar. 16, 2016.
(Continued)

*Primary Examiner* — Thomas Skibinski
(74) *Attorney, Agent, or Firm* — Renner, Otto, Boisselle & Sklar, LLP

(57) ABSTRACT

A wireless power transmission device includes a detection coil and a capacitor that configure a resonance circuit. An oscillation circuit generates high-frequency current corresponding to a detection frequency for performing presence detection of an electric appliance and metal. A presence detection circuit performs presence detection of the electric appliance and the metal based on an output voltage obtained by exciting the detection coil with the high-frequency current having the detection frequency. A detection condition changing circuit performs an initial value setting mode that changes a detection condition of the presence detection circuit in accordance with a resonance characteristic. The detection condition changing circuit includes a detection
(Continued)

frequency changing circuit that changes the detection frequency in accordance with the resonance characteristic.

20 Claims, 7 Drawing Sheets

(51) Int. Cl.
   *H02J 7/02* (2016.01)
   *H02J 50/12* (2016.01)
   *H02J 50/90* (2016.01)
   *H02J 50/40* (2016.01)

(58) Field of Classification Search
   USPC .................................. 307/104; 320/107–115
   See application file for complete search history.

(56) References Cited

U.S. PATENT DOCUMENTS

| | | |
|---|---|---|
| 2009/0322280 A1 | 12/2009 | Kamijo et al. |
| 2010/0148939 A1 | 6/2010 | Yamada et al. |
| 2012/0043825 A1 | 2/2012 | Urano |
| 2013/0027078 A1 | 1/2013 | Nakano et al. |

FOREIGN PATENT DOCUMENTS

| | | |
|---|---|---|
| JP | 2010-011588 A | 1/2010 |
| JP | 2010-148174 A | 7/2010 |
| JP | 2011-125184 A | 6/2011 |
| JP | 2012-050286 A | 3/2012 |
| JP | 2012-130173 A | 7/2012 |
| JP | 2013-034292 A | 2/2013 |

OTHER PUBLICATIONS

International Preliminary Report on Patentability for corresponding International Application No. PCT/JP2014/001048 dated Sep. 8, 2015.

International Search Report for corresponding International Application No. PCT/JP2014/001048 dated Apr. 28, 2014.

* cited by examiner

WIRELESS POWER TRANSMISSION DEVICE

TECHNICAL FIELD

The present invention relates to a wireless power transmission device.

BACKGROUND ART

As one type of a wireless power transmission device, patent document 1 discloses a wireless power supplying device that detects displacement of an electric appliance, which is a power supplying subject, from the power factor of power supplied from a primary resonance circuit. The power supplying device adjusts the characteristics of the primary resonance circuit based on the power factor to limit decreases in the power supplying efficiency when displacement occurs.

In the power supplying device, if a power supplying operation is performed when there is a foreign matter, the foreign matter may be heated. It is thus desirable that such a foreign matter be detected to stop the power supplying operation.

Patent document 2 discloses a wireless power supplying device that includes a detection coil for detecting metal in addition to a primary coil for supplying power. The power supplying device excites and drives the primary coil to supply an electric appliance with power. Further, the power supplying device excites and drives the detection coil to detect the electric appliance or a foreign matter, such as metal, based on changes in the impedance of the detection coil.

Patent Document 1: Japanese Laid-Open Patent Publication No. 2012-130173
Patent Document 2: Japanese Laid-Open Patent Publication No. 2006-230129

SUMMARY OF THE INVENTION

In the wireless power supplying device that includes the detection coil, the inductance varies between detection coils. Further, the capacitance varies between capacitors that form the resonance circuit with the detection coils. Such variations are caused by product differences resulting from product variations (manufacturing variations), wear over time, the usage environment (temperature), and the like. However, this is not taken into consideration in the wireless power supplying devices of the prior art.

When the inductance varies between detection coils or the capacitance varies between capacitors, the resonance characteristics differ between wireless power supplying devices. Thus, the manufactured wireless power transmission devices cannot all be maintained with the same detection accuracy.

The resonance characteristics also change when the inductance or capacitance is varied by wear over time or the usage environment. Thus, a fixed detection accuracy cannot be maintained when used over a long period or when the usage environment (temperature etc.) changes.

In particular, there is a wireless power transmission device (power supplying device) including a setting surface divided into a plurality of power supplying areas. Each power supplying area is provided with a detection coil. An electric appliance is set on the setting surface. In this case, when the inductance of a detection coil or the capacitance of a corresponding capacitor varies between each power supplying area, the resonance characteristic may differ or change between each power supplying area. Thus, the same detection accuracy cannot be maintained for the power supplying areas.

The present invention provides a wireless power transmission device that allows the same accuracy for detecting metal or an electric appliance to be maintained regardless of product differences between circuit elements, wear over time, and changes in the usage environment.

One aspect of the present invention is a wireless power transmission device that performs wireless power supplying on a power reception device arranged in an electric appliance using an electromagnetic induction effect. The wireless power transmission device includes a detection coil, a capacitor that configures a resonance circuit with the detection coil, and an oscillation circuit configured to excite the detection coil with high-frequency current. The oscillation circuit is capable of generating high-frequency current corresponding to a detection frequency for performing presence detection of the electric appliance and metal. The wireless power transmission device further includes an output detection circuit, a presence detection circuit, and a detection condition changing circuit. The output detection circuit is configured to generate output voltage in accordance with excitation current flowing through the detection coil. The presence detection circuit is configured to perform presence detection of the electric appliance and the metal based on the output voltage obtained by exciting the detection coil with the high-frequency current having the detection frequency. The detection condition changing circuit is capable of performing an initial value setting mode that changes a detection condition of the presence detection circuit in accordance with a resonance characteristic determined by the detection coil and the capacitor.

The wireless power transmission device according to the present invention allows the same accuracy for detecting metal or an electric appliance to be maintained regardless of product differences between circuit elements, wear over time, and changes in the usage environment.

DESCRIPTION OF THE EMBODIMENTS

One embodiment of a wireless power transmission device will now be described with reference to the drawings.

Figure 1:
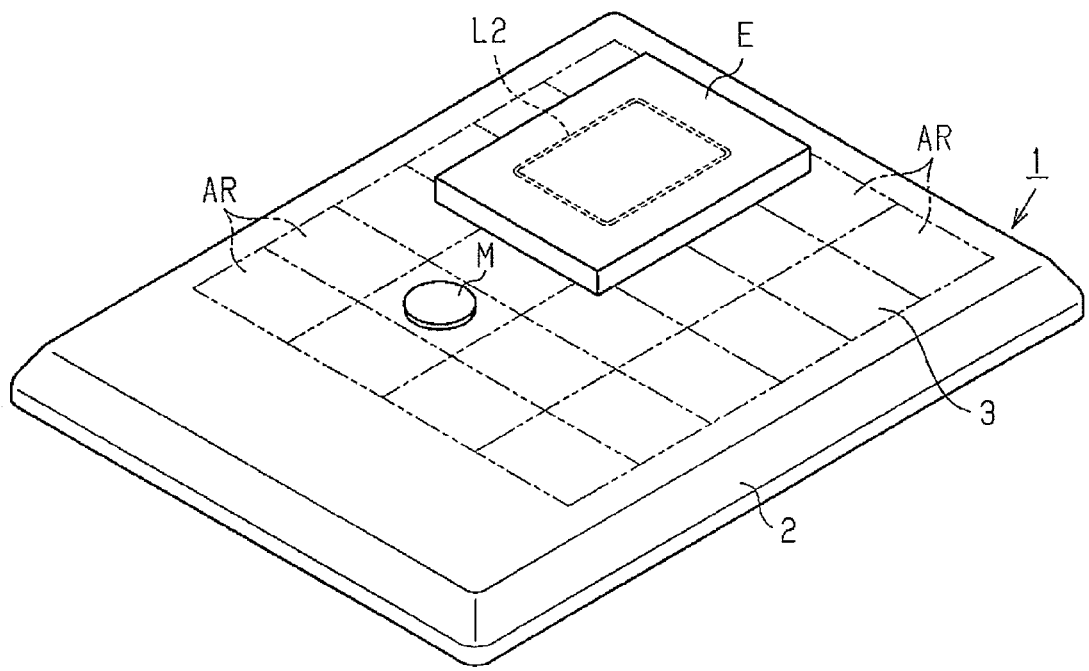
FIG. 1 is a perspective view entirely showing a wireless power transmission device and an electric appliance.

FIG. 1 is a perspective view showing a wireless power transmission device (hereinafter referred to as the power supplying device) 1 and an electric appliance (hereinafter referred to as the appliance) E, which is supplied with power from the power supplying device 1 through wireless connection.

The power supplying device 1 includes a housing 2, which is tetragonal and generally plate-shaped. The housing 2 includes a setting surface 3 on which the appliance E is set. The setting surface 3 is a flat surface. The setting surface 3 is divided into, for example, a plurality of tetragonal power supplying areas AR. In the present embodiment, twenty-four power supplying areas AT are laid out in four columns (in the sideward direction) and six rows (in the longitudinal direction).

Figure 2:
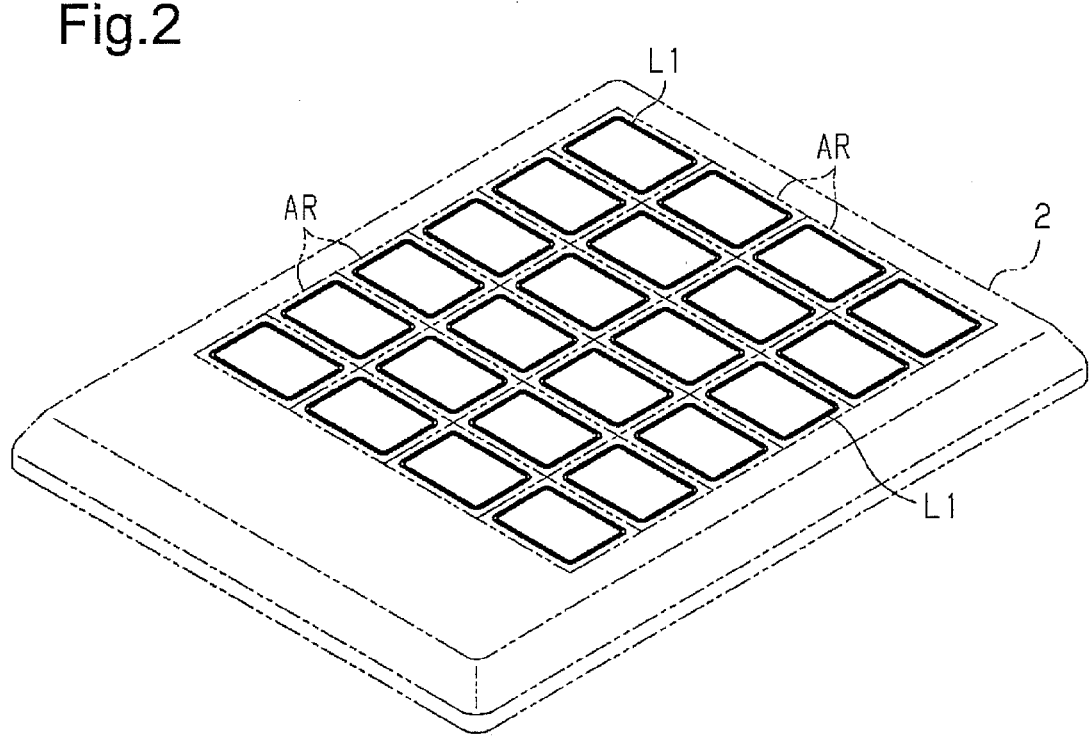
FIG. 2 is a diagram showing the layout of primary coils arranged in power supplying areas.

As shown in FIG. 2, a primary coil L1 is arranged at a location corresponding to each power supplying area AR in the housing 2. The primary coil L1 is wound into a tetragonal shape in conformance with the outer shape of the power supplying area AR. Further, a basic power supplying unit circuit 4 (refer to FIG. 3) is arranged in the housing 2 for each power supplying area AR. The primary coil L1 of each power supplying area AR is connected to the corresponding basic power supplying unit circuit 4 and forms an alternating field based on the high-frequency current supplied from the basic power supplying unit circuit 4. The high-frequency current has a predetermined frequency (e.g., power supplying resonance frequency fp when supplying power).

Figure 3:
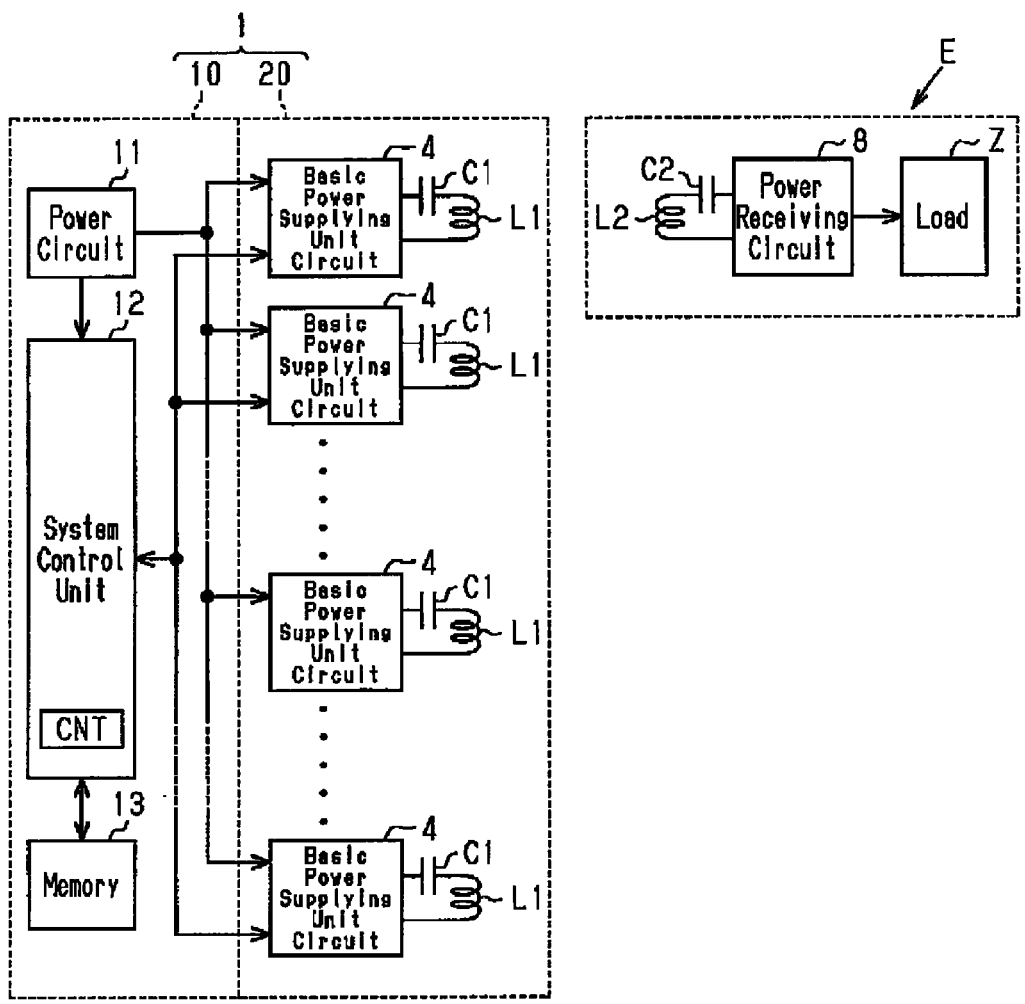
FIG. 3 is an electric block circuit diagram of the wireless power transmission device and the electric appliance.

The electric configuration of the power supplying device 1 and the appliance E will now be described with reference to FIG. 3.

Appliance E

The appliance E will first be described. As shown in FIG. 3, the appliance E includes a power receiving circuit 8 and a load Z. The power receiving circuit 8 serves as a power receiving device that receives secondary power from the power supplying device 1.

Figure 4:
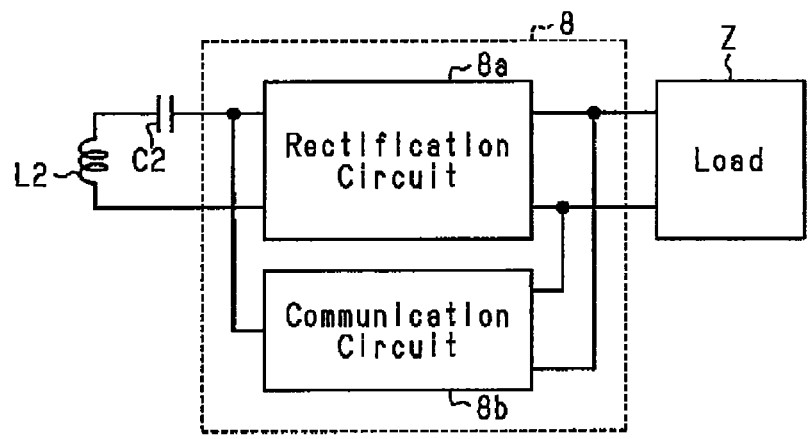
FIG. 4 is an electric block circuit diagram of a power receiving device of the electric appliance.

As shown in FIG. 4, the power receiving circuit 8 includes a rectification circuit 8a and a communication circuit 8b.

The rectification circuit 8a is connected to a secondary resonance circuit of the appliance E. The secondary resonance circuit is a series circuit formed by a secondary coil L2 and a resonance capacitor C2. The secondary coil L2 generates secondary power based on the alternating field formed by the primary coil L1 and outputs the secondary power to the rectification circuit 8a. The secondary power is generated by the secondary coil L2 through electromagnetic induction when excited by the primary coil L1. The rectification circuit 8a converts the secondary power to DC voltage that is free from ripples. The rectification circuit 8a supplies the DC voltage to the load Z of the appliance E. In this case, for example, a DC/DC converter may be arranged between the rectification circuit 8a and the load Z, and the DC/DC converter may convert the DC voltage from the rectification circuit 8a to DC voltage that is applicable as the power for the load Z of the appliance E.

The load Z may be any device driven by the secondary power generated by the secondary coil L2. For example, the load Z may be a device that is used on the setting surface 3 and driven by the DC power generated by the rectification circuit 8a. Alternatively, the load Z may be a device used on the setting surface 3 and driven by AC power that directly uses the secondary power. As another option, the load Z may be a charger that charges an incorporated battery (rechargeable battery) with the DC power generated by the rectification circuit 8a.

The DC voltage generated by the rectification circuit 8a is also used as a drive source of the communication circuit 8b. When the above-described DC/DC converter is employed, the DC/DC converter may convert the DC voltage from the rectification circuit 8a to DC voltage that is applicable as the power of the communication circuit 8b. The communication circuit 8b generates an appliance authentication signal ID and an excitation request signal RQ and transmits these signals via the secondary coil L2 to the power supplying device 1. The appliance authentication signal ID indicates that the appliance E is the correct appliance and is allowed to be supplied with power from the power supplying device 1. The excitation request signal RQ is transmitted when requesting the power supplying device 1 to supply power.

When, for example, a power switch of the appliance is switched off and the load Z is not driven, the communication circuit 8b does not generate the appliance authentication signal ID and the excitation request signal RQ. Further, when, for example, a microcomputer of the appliance E determines to suspend the supply of power, the communication circuit 8b does not generate the appliance authentication signal ID and the excitation request signal RQ. For example, when the appliance E is a notebook computer and the notebook is operated in a power save mode, the communication circuit 8b may be configured not to generate the appliance authentication signal ID and the excitation request signal RQ.

Each of the appliance authentication signal ID and the excitation request signal RQ is a binary signal of a plurality of bits. The communication circuit 8b outputs the binary signal to a power receiving line, which connects the resonance capacitor C2 and the rectification circuit 8a. When a binary signal is output to the power receiving line, magnetic induction occurs with the primary coil L1 excited and driven by the power supplying frequency fp. This changes the amplitude of the secondary current flowing through the secondary coil L2 in accordance with the binary signal.

Changes in the amplitude of the secondary current change the magnetic flux extending through the secondary coil L2, and the changed magnetic flux is propagated to the primary coil L1 through electromagnetic induction. This changes the amplitude of the primary coil flowing through the primary coil L1.

More specifically, a binary signal (appliance authentication signal ID and excitation request signal RQ) amplitude-modulates the secondary current that has the power supplying frequency fp and flows through the secondary coil L2. Magnetic flux changes, which are based on the amplitude-modulated secondary current, are transmitted to the primary coil L1.

Power Supplying Device 1

The power supplying device 1 will now be described. As shown in FIG. 3, the power supplying device 1 includes a common unit 10 and a basic unit 20. The basic unit 20 includes plural sets (in the present embodiment, twenty-four sets) of the primary coils L1, the resonance capacitors C1, and the basic power supplying unit circuits 4. The primary coils L1 and the resonance capacitors C1 form resonance circuits.

The common unit 10 includes a power circuit 11, which supplies power to the basic unit 20, a system control unit 12, which controls the basic unit 20, and a memory 13, which stores various types of data.

The power circuit 11, which includes a rectification circuit and a DC/DC converter, rectifies commercial power voltage with the rectification circuit to DC voltage and then converts the DC voltage to the desired DC voltage Vdd with the DC/DC converter. The DC voltage Vdd is supplied as drive power to the system control unit 12, the memory 13, and the basic unit 20.

The system control unit 12 is formed by a microcomputer and controls the basic unit 20. The system control unit 12 controls the twenty-four basic power supplying unit circuits 4 in accordance with a control program of the microcomputer.

The system control unit 12 is able to function in an initial value setting mode for performing an initial value setting process, a presence detection mode for detecting whether or not the appliance E is set on one of the power supplying areas AR, and a power supplying mode for performing power supplying control.

In the initial value setting mode, the system control unit 12 sets the detection frequency fs and a detection read time ts, which are used by each basic power supplying unit circuit 4 in the presence detection mode. The detection frequency fs is the frequency of the high-frequency current that excites the primary coil L1. The detection read time ts is used to detect the primary current (excitation current) flowing through the primary coil L1 that is excited by the detection frequency fs.

In the presence detection mode, the system control unit 12 excites each primary coil L1 through the corresponding basic power supplying unit circuit 4 with high-frequency current having the detection frequency fs to read an output voltage Vs, which is in accordance with the primary current flowing through the primary coil L1, from the basic power supplying unit circuit 4. The output voltage Vs is read based on the detection read time ts. Based on the output voltage Vs obtained from each basic power supplying unit circuit 4, the system control unit 12 determines whether or not the appliance E or metal M (refer to FIG. 1) is present in each power supplying area AR. Accordingly, the system control unit 12 functions as a presence detection circuit.

Further, in the present embodiment, the primary coils L1 are used as detection coils for detecting the presence of an object such as the appliance E or the metal M in addition to being used as power supplying coils for supplying power to the appliance E.

In the power supplying mode, the system control unit 12 controls each basic power supplying unit circuit 4 in a power supplying state or a suspension state based on the presence detection result in the presence detection mode.

The memory 13 is a non-volatile memory that stores data used by the system control unit 12 when performing various types of processes. Further, the memory 13 includes a plurality of storage regions assigned for each of the twenty-four power supplying areas AR. The information related to each power supplying area AR is stored in the corresponding storage region.

For example, the detection frequency fs and the detection read time ts, which are set in the initial value setting mode for each basic power supplying unit circuit 4, are stored in the storage region assigned to each power supplying area AR (i.e., basic power supplying unit circuit 4).

The system control unit 12 controls the transfer of data between each basic power supplying unit circuit 4 and the system control unit 12.

The configuration of each basic power supplying unit circuit 4 will now be described with reference to FIG. 5. The basic power supplying unit circuits 4 have the same configuration. Thus, for the sake of brevity, only one basic power supplying unit circuit 4 will be described.

Figure 5:
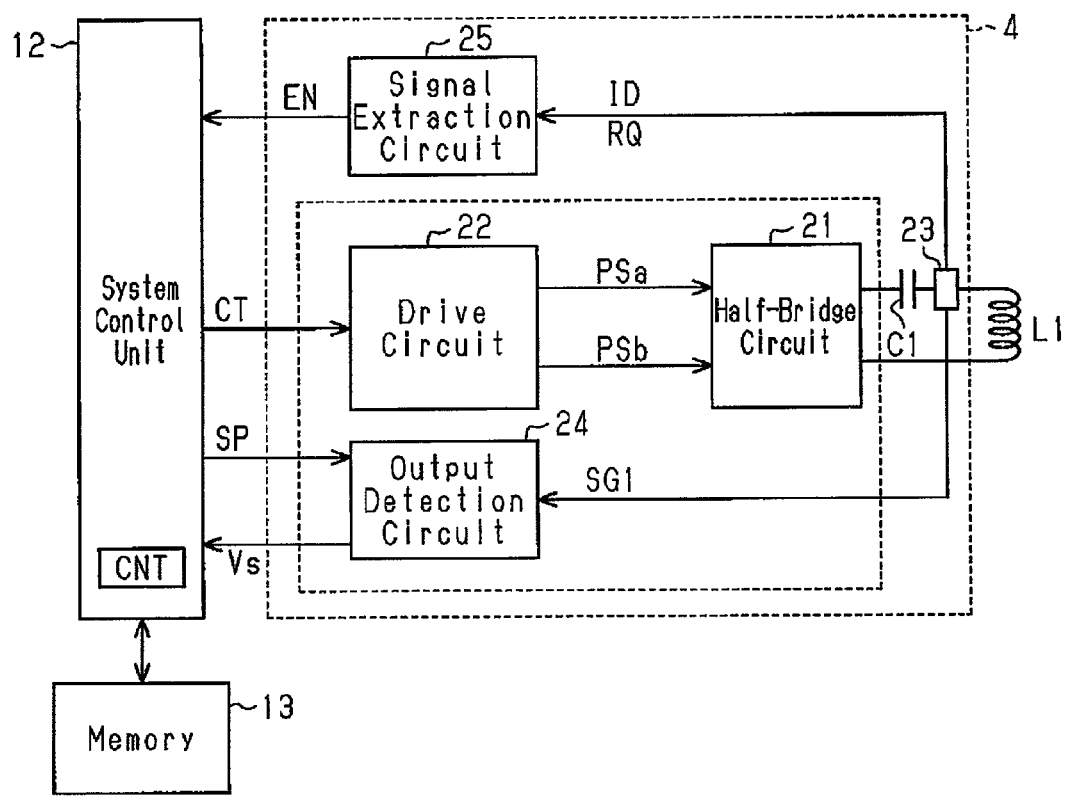
FIG. 5 is an electric block circuit diagram illustrating a basic power supplying unit circuit.

As shown in FIG. 5, the basic power supplying unit circuit 4 includes a half-bridge circuit 21, a drive circuit 22, a current detection circuit 23, an output detection circuit 24, and a signal extraction circuit 25.

Half-Bridge Circuit 21

Figure 6:
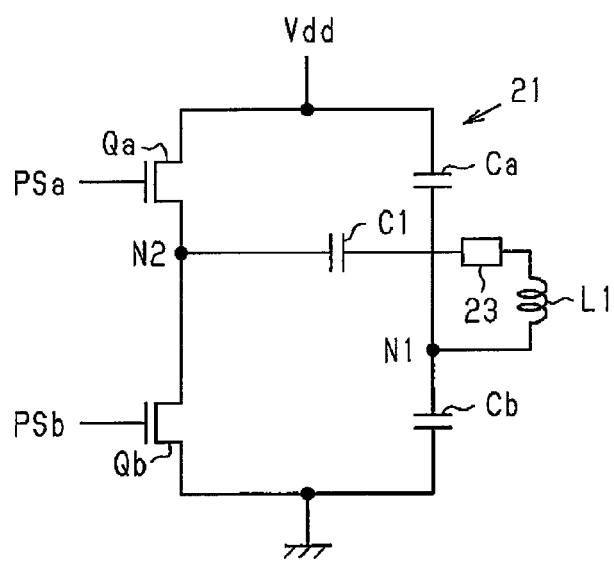
FIG. 6 is an electric circuit diagram illustrating a half-bridge circuit.

Referring to FIG. 6, a known half-bridge circuit may be used as the half-bridge circuit 21. The half-bridge circuit 21 includes a voltage dividing circuit, which includes series-connected first and second capacitors Ca and Cb, and a drive circuit, which includes series-connected first and second power transistors Qa and Qb. In the present embodiment, the first and second power transistors Qa and Qb are configured by N-channel MOSFETs.

A series circuit (primary resonance circuit) of the primary coil L1 and the resonance circuit C1 is connected between a node N1, which is located between the first capacitor Ca and the second capacitor Cb, and a node N2, which is located between the first power transistor Qa and the second power transistor Qb.

The gate terminal of the first power transistor Qa is provided with a drive signal PSa from the drive circuit 22.

The gate terminal of the second power transistor Qb is provided with a drive signal PSb from the drive circuit 22. The first and second power transistors Qa and Qb are alternately activated and deactivated based on the drive signals PSa and PSb. As a result, high-frequency current flows through the primary coil L1 and generates an alternating field.

Drive Circuit 22

The drive circuit 22 is provided with an excitation control signal CT from the system control unit 12. The excitation control signal CT controls the frequency of the high-frequency current that excites the primary coil L1. The drive circuit 22 generates the drive signals PSa and PSb based on the excitation control signal CT.

The drive signals PSa and PSb specify a dead time during which the first and second power transistors Qa and Qb are not simultaneously activated. The drive signal PSb is generated so that the deactivation time and activation time of the second power transistor Qb are substantially the same. The drive signal PSa is generated so that the activation time of the first power transistor Qa is shortened and the deactivation time is lengthened accordingly. In the present embodiment, the half-bridge circuit 21 and the drive circuit 22 form an oscillation circuit.

The excitation control signal CT from the system control unit 12 is a data signal for determining the frequency of the high-frequency current that excites the primary coil L1.

In the initial value setting mode, the system control unit 12 adjusts the frequency of the high-frequency current that excites the primary coil L1 with an adjusted frequency fx for each power supplying area Ar and generates the excitation control signal CT in accordance with the adjusted frequency fx.

Accordingly, in the initial value setting mode, the system control unit 12 provides each basic power supplying unit circuit 4 (drive circuit 22) with the excitation control signal CT that excites the primary coil L1 at the adjusted frequency fx, which is adjusted in accordance with the power supplying area AR. Then, the system control unit 12 determines the detection frequency fs based on the adjusted frequency fx and optimizes the frequency of the high-frequency current that excites the primary coil L1 for each power supplying area AR.

In the presence detection mode, the system control unit 12 reads data of the detection frequency fs set for each basic power supplying unit circuit 4 from the memory 13 and generates the excitation control signal CT in accordance with the detection frequency fs. Each basic power supplying unit circuit 4 excites and drives the primary coil L1 at the detection frequency fs.

Accordingly, in the presence detection mode, the system control unit 12 provides each basic power supplying unit circuit 4 (drive circuit 22) with the excitation control signal CT that excites the primary coil L1 at the frequency (detection frequency fs) optimized for each power supplying area AR.

In the power supplying mode, the system control unit 12 generates the excitation control signal CT that excites the primary coil L1 of each power supplying area AR with a high-frequency current at the same resonance frequency (power supplying resonance frequency fp).

More specifically, in the power supplying mode, the system control unit 12 provides each basic power supplying unit circuit 4 (drive circuit 22) with the same excitation control signal CT.

Current Detection Circuit 23

Figure 7:
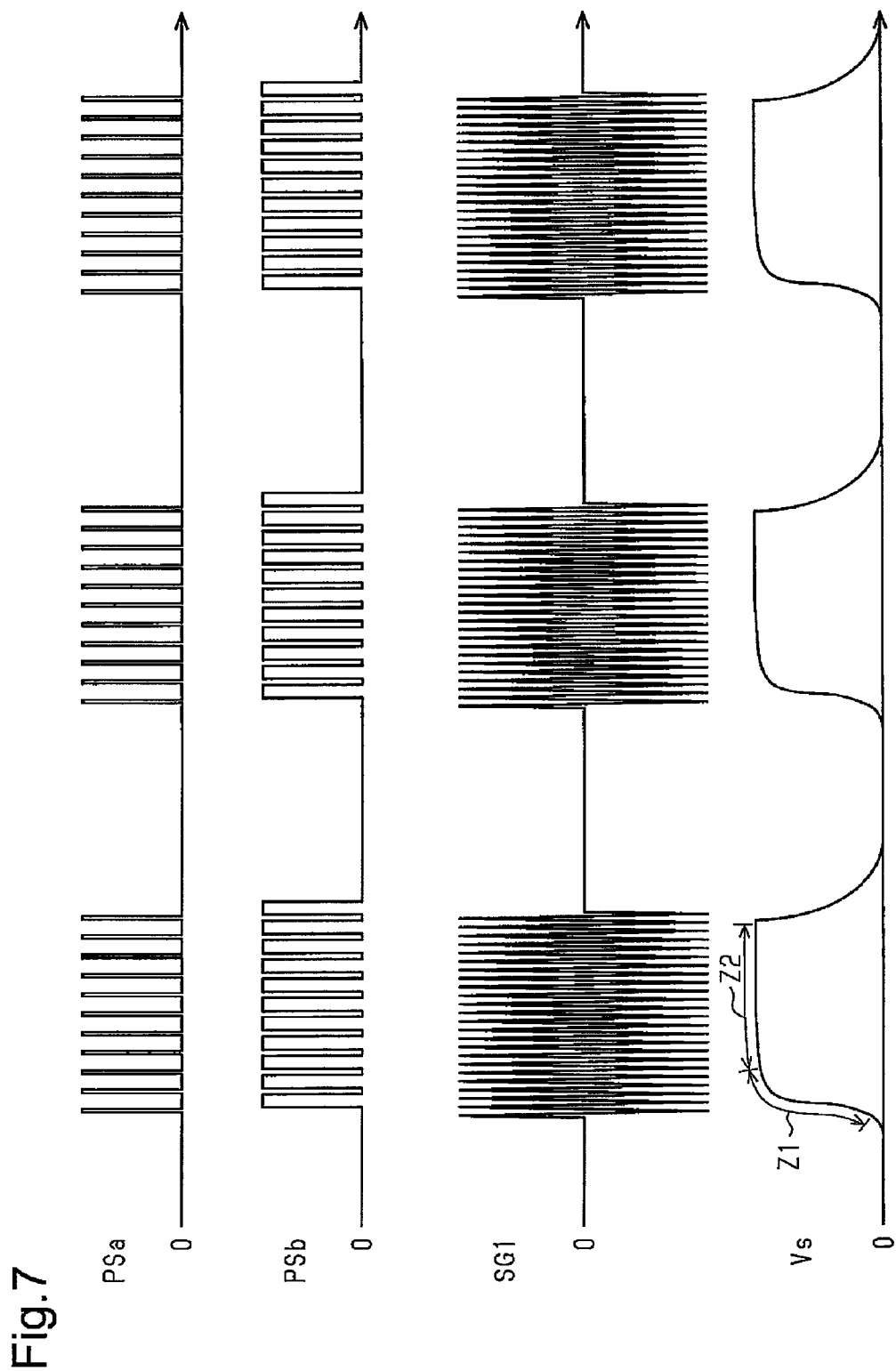
FIG. 7 is a waveform chart of each signal and illustrates the operation of the basic power supplying unit circuit.

The current detection circuit 23, which is arranged between one of the terminals of the primary coil L1 and the half-bridge circuit 21 (node N2), detects the primary current flowing through the primary coil L1 and generates a current detection signal SG1. Referring to FIG. 7, the current detection circuit 23 outputs the current detection signal SG1 when the first and second power transistors Qa and Qb are provided with the drive signals PSa and PSb.

Output Detection Circuit 24

The output detection circuit 24 is connected to the current detection circuit 23. The output detection circuit 24 generates an output voltage Vs in accordance with the current detection signal SG1 output from the current detection circuit 23. Referring to FIG. 7, the output detection circuit 24 includes an envelope detection circuit that detects the current detection signal SG1 and generates an envelope waveform signal as the output voltage Vs. The envelope waveform signal envelopes the outer side of the current detection signal SG1, Further, the output detection circuit 24 includes an AD converter that converts the output voltage Vs, which is obtained as an analog value, to a digital value. The AD converter outputs the digital value of the output voltage Vs to the system control unit 12 in response to a sampling signal SP from the system control unit 12.

The system control unit 12 controls the output timing of the sampling signal SP, that is, the timing for reading the output voltage Vs from each basic power supplying unit circuit 4 (output detection circuit 24). The system control unit 12 sets the read time of each basic power supplying unit circuit 4 to the digital value of the output voltage Vs after the primary coil L1 is excited.

More specifically, the read time specifies the timing for reading the output voltage Vs (digital value) from the basic power supplying unit circuit 4 (output detection circuit 24) after the system control unit 12 outputs the excitation control signal CT to the basic power supplying unit circuit 4 (drive circuit 22).

In the present embodiment, the system control unit 12 performs a frequency adjustment process and a read time adjustment process in the initial value setting mode. Here, the system control unit sets the read time of the output voltage Vs during the read time adjustment process to a value that differs from the read time of the output voltage Vs during the frequency adjustment process.

In detail, in the frequency adjustment process, the system control unit 12 sets each basic power supplying unit circuit 4 to the same read time, and outputs the sampling signal SP to each basic power supplying unit circuit 4 at the same read time. In the read time adjustment process, the system control unit 12 adjusts the read time of the output voltage Vs with the adjusted read time tx for each basic power supplying unit circuit 4, and outputs the sampling signal SP based on the adjusted read time tx corresponding to each basic power supplying unit circuit 4 (i.e., power supplying area AR). In this manner, the system control unit 12 adjusts the read time (adjusted read time tx) to be suitable for each power supplying area AR through the read time adjustment process. This optimizes the timing for reading the output voltage Vs from each basic power supplying unit circuit 4 in the presence detection mode. That is, the detection read time ts is optimized for each power supplying area AR.

Accordingly, in the presence detection mode, when controlling each basic power supplying unit circuit 4, the system control unit 12 reads the data of the detection read time ts, which is set exclusively for each basic power supplying unit circuit 4 (power supplying area AR), from the corresponding storage region of the memory 13.

Then, the system control unit 12 provides each basic power supplying unit circuit 4 (output detection circuit 24) with the sampling signal SP at the detection read time ts corresponding to the basic power supplying unit circuit 4 to read the output voltage Vs.

Signal Extraction Circuit 25

The signal extraction circuit 25 is connected to the current detection circuit 23. The signal extraction circuit 25 is supplied with the primary current of the primary coil L1 via the current detection circuit 23 during the period the primary coil L1 is excited and driven at the power supplying resonance frequency fp. That is, the signal extraction circuit 25 receives a transmission signal (amplitude modulation signal) from the secondary coil L2 of the appliance E, which is set on the setting surface 3, via the current detection circuit 23.

The signal extraction circuit 25 extracts the appliance authentication signal ID and the excitation request signal RQ from the received transmission signal and outputs an enable signal EN to the system control unit 12. The signal extraction circuit 25 does not output the enable signal EN when only one of the appliance authentication signal ID and the excitation request signal RQ is received or when both signals are not received.

The operation of the power supplying device 1 will now be described. Before describing the operation, the principle of the presence detection will be described with reference to FIG. 8 to facilitate understanding of the operation.

Figure 8:
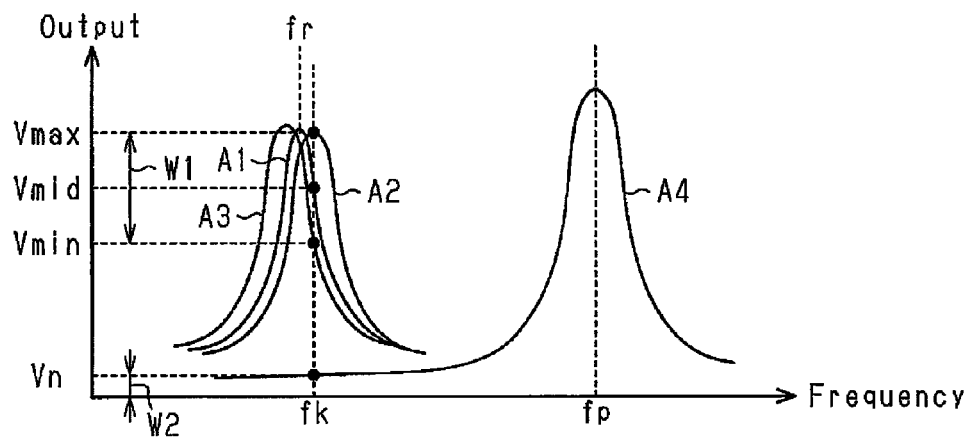
FIG. 8 is a characteristic chart showing the output relative to the frequency and illustrating the principle pf presence detection.

Referring to FIG. 8, when nothing is set on the power supplying area AR, the first resonance characteristic A1 shows the output characteristics of the primary coil L1 relative to the frequency in the primary resonance circuit formed by the series circuit of the primary coil L1 and the resonance capacitor C1.

When metal M is set on the power supplying area AR, the second resonance characteristic A2 shows the output characteristics of the primary coil L1 relative to the frequency between the metal M and the primary coil L1.

When the appliance E is set on the power supplying area AR, the third resonance characteristic A3 shows the output characteristics of the primary coil L1 relative to the frequency in the secondary resonance circuit formed by the series circuit of the secondary coil L2 and the resonance capacitor C2.

With regard to the first to third resonance characteristics A1 to A3, it is known through experiments, tests, and the like, which have been conducted in advance, that the resonance frequency increases in the order of the third resonance characteristic A3, the first resonance characteristic A1, and the second resonance characteristic A2. In addition, the frequency bands of the first to third resonance characteristics A1 to A3 are based on changes in the inductance resulting from the metal M or the appliance E and are thus extremely close to one another.

Referring to FIG. 8, if nothing is placed on the power supplying area AR when the primary coil L1 is excited by a specific frequency fk of the first resonance characteristic A1, the inductance of the primary coil L1 does not change. Thus, the resonance characteristic does not shift from the first resonance characteristic A1. Here, the output of the primary coil L1 relative to the specific frequency fk is a middle value Vmid.

If metal M is placed on the power supplying area AR when the primary coil L1 is excited by the specific frequency fk of the first resonance characteristic A1, the inductance of the primary coil L1 is changed by the metal M. Thus, the resonance characteristic shifts from the first resonance characteristic A1 to the second resonance characteristic A2. As a result, the output of the primary coil L1 relative to the specific frequency fk changes to a maximum value Vmax.

Further, if the appliance E is placed on the power supplying area AR when the primary coil L1 is excited by the specific frequency fk of the first resonance characteristic A1, the inductance of the primary coil L1 is changed by the appliance E. Thus, the resonance characteristic shifts from the first resonance characteristic A1 to the third resonance characteristic A3. As a result, the output of the primary coil L1 relative to the specific frequency fk changes to a minimum value Vmin.

Accordingly, the specific frequency fk of the first resonance characteristic A1 is set as the detection frequency fs for presence detection and used to excite and drive the primary coil L1. Further, by apprehending the output value of the primary coil L1 relative to the detection frequency fs in advance, it may be detected whether or not the appliance E or the metal M is present on the power supplying area AR.

In other words, to perform presence detection, when nothing is present on the power supplying area AR, the first resonance characteristic A1 needs to be obtained in advance from the detection frequency fs.

Here, the detection frequency fs is set to a frequency that decreases the output of the primary coil L1 relative to the frequency of the first resonance characteristic A1 when the appliance E is set on the power supplying area AR (primary coil L1) regardless of the location, size, or the like of the appliance E. Further, the detection frequency fs is set to a frequency that increases the output of the primary coil L1 relative to the frequency of the first resonance characteristic A1 when the metal M is set on the power supplying area AR (primary coil L1) regardless of the location, size, or the like of the metal M.

Further, each primary coil L1 is excited and driven solely or in cooperation with another primary coil L1 to supply power to the secondary coil L2 of the appliance E set on the power supplying area AR. The power supplying resonance frequency fp used by the basic power supplying unit circuit 4 to drive and excite the primary coil L1 and supply power to the appliance E is set in the following manner. When the appliance E is set on the power supplying area AR, the primary coil L1 and the secondary coil L2 form a transformer. In such a structure, the power supplying resonance frequency fp is set to a resonance frequency that is determined by the inductance component and the capacitor component of the appliance E.

In this manner, in the present embodiment, the primary coil L1 is excited and driven at the power supplying resonance frequency fp determined by the appliance E. This allows the appliance E to be supplied with power from the primary coil L1 with a low power loss.

The interval of the power supplying frequency fp and the detection frequency fs is set as described below.

Referring to FIG. 8, a fourth resonance characteristic A4 is the resonance characteristic when the power supplying resonance frequency fp is obtained at a maximum output and shows the output characteristics of the primary coil L1 relative to the frequency in the secondary resonance circuit when the appliance E is set in the power supplying area AR.

In the fourth resonance characteristic, the output of the primary coil L1 relative to the detection frequency fs is voltage value Vn, which is smaller than the minimum value Vmin and close to zero volts. The voltage value Vn decreases as the interval increases between the power supplying resonance frequency fp and the detection frequency fs.

The difference W1 between the maximum value Vmax and the minimum value Vmin is greater than the difference W2 between the voltage value Vn, which corresponds to the detection frequency fs of the fourth resonance characteristic A4, and zero volts (i.e., W1>W2).

Accordingly, the relationship of W1>W2 is satisfied even when the primary coil L1 of a certain power supplying area AR is excited and driven at the power supplying resonance frequency fp and supplied with power, while the primary coil L1 of an adjacent power supplying area AR is excited and driven by a high-frequency current having the detection frequency fs to perform presence detection. Thus, the presence detection operation using the detection frequency fs is not much affected by the power supplying operation using the power supplying resonance frequency fp.

In other words, the resonance frequency determined by the inductance component and the capacitor component of the appliance are set to have the fourth resonance characteristic A4 shown in FIG. 8 so that the interval of the power supplying resonance frequency fp and the detection frequency fs is W1>W2.

In the present embodiment, the detection frequency fs is set to around 70 kHz, and the power supplying resonance frequency is set to around 140 kHz. The detection frequency fs may be adjusted, for example, prior to shipment from the factory, in fixed usage cycles, or when an adjustment switch (not shown) of the power supplying device 1 is operated.

Initial Value Setting Mode

Due to product differences resulting from manufacturing variations or wear over time, the inductance of the primary coil L1 and the capacitance of the resonance capacitor C1 is not necessarily the same in each power supplying area AR (basic power supplying unit circuit 4). Thus, the first resonance characteristic A1, which is determined by the primary coil L1 and the resonance capacitor C1, differs between the power supplying areas AR.

Thus, when the primary coils L1 are all excited at the same detection frequency fs to perform presence detection, the output voltage Vs, which is obtained based on the detection frequency fs, differs between the power supplying areas AR.

As a result, the same output voltage Vs cannot be obtained from the output detection circuit 24 of each basic power supplying unit circuit 4, and presence detection cannot be performed with high accuracy. Thus, to maintain the same output voltage Vs in every one of the power supplying areas AR (basic power supplying unit circuit 4) and perform accurate presence detection of the appliance E and metal M, the system control unit 12 changes the presence detection conditions for each power supplying area AR in the initial value setting mode. Accordingly, the system control unit 12 functions as a detection condition changing circuit that changes the conditions for detecting the presence of an object. In the present embodiment, the detection frequency fs and the detection read time ts are set as the presence detection conditions for each power supplying area AR.

In this case, the system control unit 12 (detection condition changing circuit) functions as a detection frequency changing circuit that changes the detection frequency fs. In the present embodiment, for example, the detection frequency changing circuit is configured to functionally include a frequency adjustment circuit, a first comparison circuit, and a first setting circuit. The frequency adjustment circuit uses the adjusted frequency fx to adjust the detection frequency fs. The first comparison circuit compares the output voltage Vs, which is obtained based on the adjusted frequency fx, with a certain target voltage. The first setting circuit determines the detection frequency fs based on the comparison result of the first comparison circuit.

Further, the system control unit 12 (detection condition changing circuit) functions as a detection read time changing circuit that changes the detection read time ts. In the present embodiment, for example, the detection read time changing circuit is configured to functionally include a read time adjustment circuit, a second comparison circuit, and a second setting circuit. The read time adjustment circuit uses the adjusted read time tx to adjust the detection read time ts. The second comparison circuit compares the output voltage Vs, which is read based on the adjusted read time tx, with a certain target voltage. The second setting circuit determines the detection read time ts based on the comparison result of the second comparison circuit.

The system control unit 12 performs the initial value setting mode when there is nothing set on the setting surface 3 in the twenty-four power supplying areas AR. For example, when the adjustment switch (not shown) is operated and an ON signal is received from the adjustment switch, the system control unit 12 performs the initial value setting mode in accordance with the flowchart shown in FIG. 9.

First, in step S1, the system control unit 12 initializes the data stored in the memory 13 to clear the detection frequency fs and the detection read time ts set for each basic power supplying unit circuit 4. Further, the system control unit 12 sets a count value of an address counter CNT, which is incorporated in the system control unit 12 to "1".

In step S2, the system control unit 12 selects the first power supplying area AR based on count value "1" of the address counter CNT.

In step S3, the system control unit 12 executes a frequency adjustment process and sets the detection frequency fs for the primary coil L1 in the first power supplying area AR.

Frequency Adjustment Process

Figure 12A:
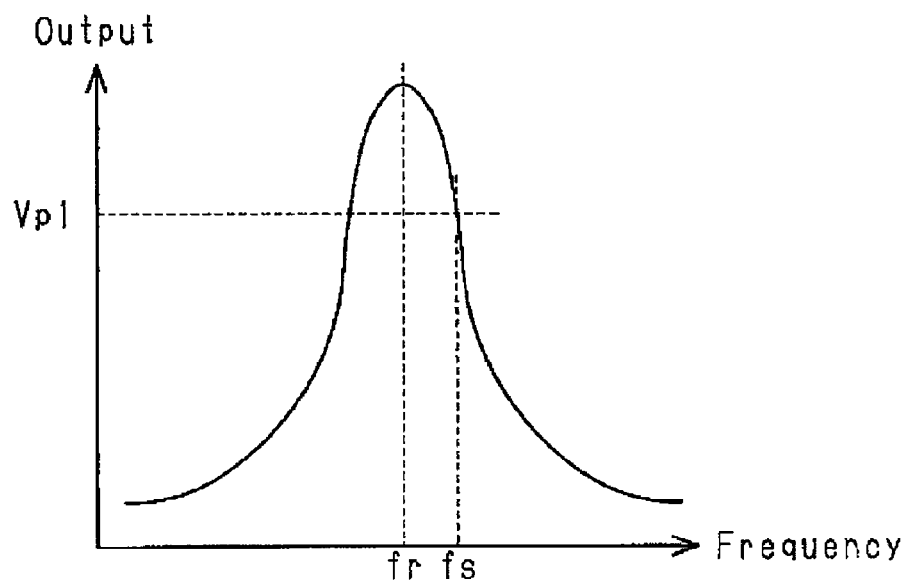
FIG. 12A is a waveform chart illustrating a detection frequency and a first target voltage.

Referring to FIG. 12A, in the frequency adjustment process, the system control unit 12 determines the detection frequency fs, that is, the frequency obtained as the first target voltage Vp1 that is determined in advance by the output voltage generated by the output detection circuit 24 when the primary coil L1 is excited.

The first target voltage Vp1 is the voltage corresponding to a frequency separated from the resonance frequency fr of the first resonance characteristic A1 (detection frequency fs) and is obtained in advance through tests, calculations, and the like. The first target voltage Vp1 is selected from a frequency range unaffected by noise or the like and in which changes in the output voltage caused by changes in the frequency are small.

As shown in FIG. 12A, two frequencies corresponding to the first target voltage Vp1 are present at the two sides of the resonance frequency fr of the first resonance characteristic A1. In the present embodiment, the frequency at the higher side of the resonance frequency fr is selected as the detection frequency fs.

Referring to FIG. 8, when the primary coil L1 is excited at the resonance frequency fr of the first resonance characteristic A1, the output voltage Vs is the maximum value Vmax. However, in the vicinity of the resonance frequency fr, a slight frequency change greatly changes the output voltage. Thus, in the vicinity of the resonance frequency fr, it is difficult to obtain a stable output voltage that is unaffected by noise or the like. Taking this into consideration, the detection frequency fs is set at a frequency separated from the resonance frequency fr as a frequency for obtaining an output voltage that is unaffected by noise or the like and that does not change much when the frequency changes.

Figure 10:
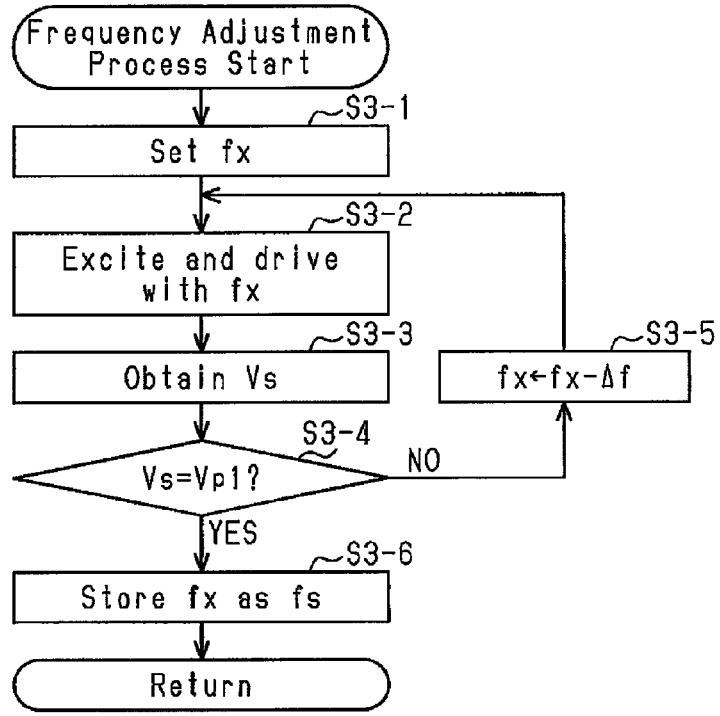
FIG. 10 is a flowchart illustrating a frequency adjustment process.

FIG. 10 is a flowchart illustrating a frequency adjustment process. First, in step S3-1, the system control unit 12 sets the initial value of the adjusted frequency fx to excite and drive the primary coil L1 of the first power supplying area AR (power supplying area AR selected in step S2). The initial value of the adjusted frequency fx is obtained in advance through experiments, tests, calculations, and the like and is set at a value at which the output voltage Vs does not become greater than or equal to the first target voltage Vp1 when exciting and driving the primary coil L1 based on the initial value of the adjusted frequency fx.

More specifically, the first resonance characteristic A1 differs between each power supplying area AR. Taking this into consideration, the initial value of the adjusted frequency fx is set including a certain margin so that the output voltage Vs, which is generated based on the initial value of the adjusted frequency fx in each power supplying area AR, does not become greater than or equal to the first target voltage Vp1.

In step S3-2, the system control unit 12 provides the drive circuit 22 with an excitation control signal CT having the adjusted frequency fx (here, initial value) and excites and drives the primary coil L1 of the first power supplying area AR at the adjusted frequency fx.

In step S3-3, the system control unit 12 outputs the sampling signal SP and obtains the output voltage Vs from the output detection circuit 24 of the first power supplying area AR.

In the frequency adjustment process, when another power supplying area AR obtains the output voltage Vs, the system control unit 12 outputs the sampling signal SF at the same timing. In other words, the read time of the output voltage Vs in the frequency adjustment process is set at the same time for every one of the power supplying areas AR.

For example, referring to FIG. 7, the read time of the output voltage Vs in the frequency adjustment process is set when the waveform of the output voltage Vs generated by the output detection circuit 24 shifts from a non-saturated region Z1 to a saturated region Z2. In detail, when the first resonance characteristic A1 differs between the power supplying areas AR, that is, when the inductance varies between the primary coils L1 and the capacitance varies between the resonance capacitors C1, the timing at which the waveform of the output voltage Vs shifts to the saturated region Z2 differs between the power supplying areas AR. Taking this into consideration, the read time in the frequency adjustment process is set in advance with a margin. This allows for accurate detection of the output voltage Vs even when the first resonance characteristic A1 differs between the power supplying areas AR and differences are produced in the waveform of the output voltage Vs obtained from the adjusted frequency fx.

In step S3-4, the system control unit 12 determines whether or not the output voltage Vs obtained by the adjusted frequency fx is the first target voltage Vp1. When the output voltage Vs is not the first target voltage Vp1 (NO in step S3-4), the system control unit 12 proceeds to step S3-5.

In step S3-5, the system control unit 12 decreases the present adjusted frequency fx by a predetermined unit frequency Δf to set a new adjusted frequency fx and returns to step S3-2.

Then, the system control unit 12 excites and drives the primary coil L1 of the first power supplying area AR again at the new adjusted frequency fx (step S3-2). Further, the system control unit 12 obtains the output voltage Vs corresponding to the new adjusted frequency fx from the output detection circuit 24 of the first power supplying area AR (step S3-3).

The system control unit 12 determines again whether or not the output voltage Vs corresponding to the new adjusted frequency fx is the first target voltage Vp1 (step S3-4). When the output voltage Vs is not the first target voltage Vp1 (NO in step S3-4), the system control unit 12 proceeds to step S3-5. Then, the system control unit 12 further decreases the present adjusted frequency fx by a predetermined unit frequency Δf to set a new adjusted frequency fx and returns to step S3-2.

Subsequently, the system control unit 12 repeats the processes of steps S3-2 to S3-5 until the output voltage Vs corresponding to the new adjusted frequency fx reaches the first target voltage Vp1.

In step S3-4, when the output voltage Vs corresponding to the new adjusted frequency fx reaches the first target voltage Vp1, the system control unit 12 proceeds to step S3-6.

Figure 9:
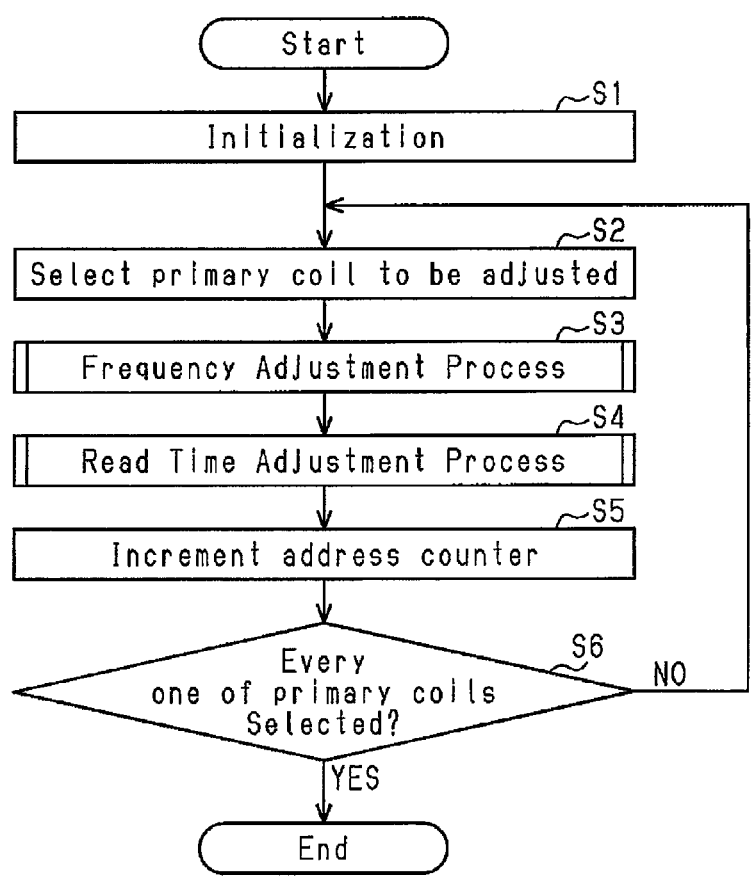
FIG. 9 is a flowchart illustrating the processing of an initial value setting mode.

In step S3-6, the system control unit 12 stores the present adjusted frequency fx as the detection frequency fs of the first power supplying area AR (basic power supplying unit circuit 4) in the memory 13 and proceeds to the next read time adjustment process (step S4 in FIG. 9).

In step S3-4, when the output voltage Vs corresponding to the present adjusted frequency fx exceeds the first target voltage Vp1 but is in a predetermined tolerable range, the system control unit 12 may proceed to step S3-6. Alternatively, when the output voltage Vs corresponding to the present adjusted frequency fx exceeds the first target voltage Vp1 and also exceeds the predetermined tolerable range, the system control unit 12 may proceed to step S3-6 and set the preceding adjusted frequency fx as the detection frequency fs.

Read Time Adjustment Process

Figure 12B:
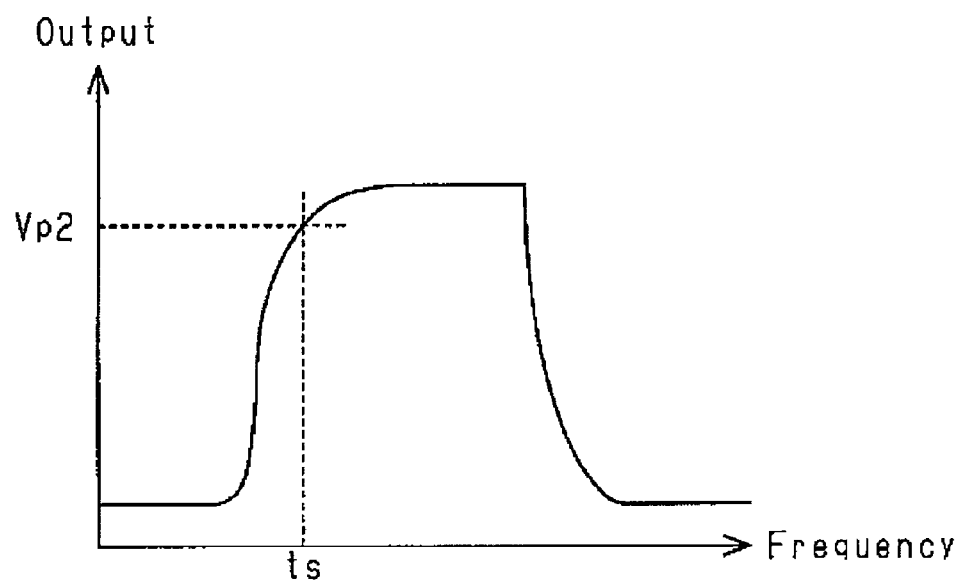
FIG. 12B is a waveform chart illustrating a detection read time and a second target voltage.

In the read time adjustment process, the system control unit 12 excites and drives the primary coil L1 at the detection frequency fs set in the frequency adjustment process. Then, referring to FIG. 12B, the system control unit 12 obtains the time from when the excitation of the primary coil L1 starts to when the output voltage Vs, which is obtained by the output detection circuit 24, reaches a predetermined second target voltage Vp2. That is, the system control unit 12 obtains the detection read time ts.

Referring to FIG. 7, the second target voltage Vp2 is a voltage included in the non-saturated region Z1 before the output voltage Vs reaches the saturated region Z2. Accordingly, even when the first resonance characteristic A1 differs between each power supplying area AR, the output voltage Vs reaches the second target voltage Vps when time elapses.

In other words, the time at which the output voltage Vs reaches the second target voltage Vp2 in each power supplying area AR is apprehended, and the output voltage Vs read from the output detection circuit 24 at that time is used as the second target voltage Vp2.

In the previous frequency adjustment process, the detection frequency fs is obtained to output the first target voltage Vp1. However, in the waveform of the output voltage Vs shown in FIG. 7, the gradient (time) of the non-saturated region Z1 that leads to the saturated region Z2 (first target voltage Vp1) is different. This is because the inductance varies between the primary coils L1 and the capacitance varies between the resonance capacitors C1. The difference is large in the non-saturated region Z1.

Accordingly, when the first resonance characteristic A1 differs between each power supplying area AR, the time the second target voltage Vp2 is reached also differs between each power supplying area AR. In other words, by reading the output voltage Vs from the output detection circuit 24 at the time the second target voltage Vp2 is reached in each power supplying area AR, the output voltage Vs becomes the second target voltage Vp2 in every one of the power supplying areas AR. The second target voltage Vp2 is obtained in advance through tests, experiments, calculations, and the like.

Figure 11:
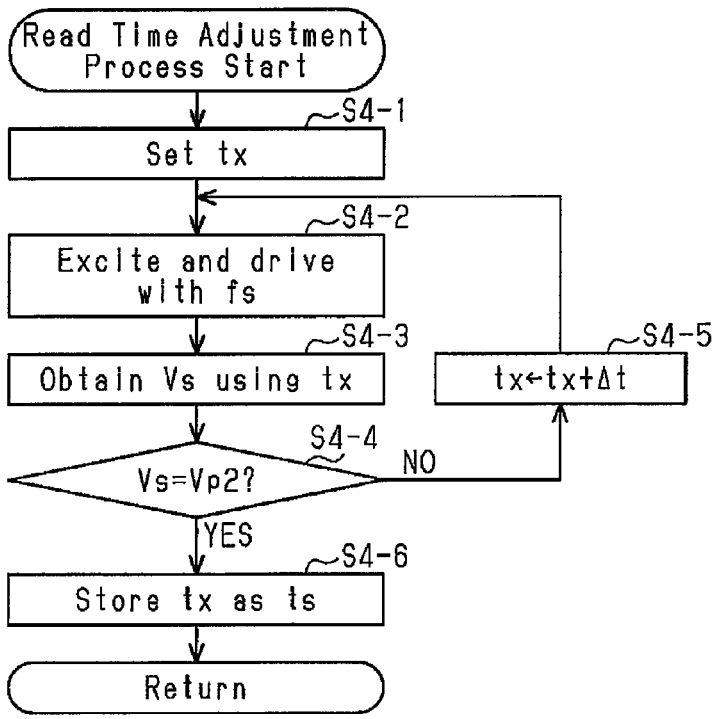
FIG. 11 is flowchart illustrating a read time adjustment process.

FIG. 11 is a flowchart illustrating a read time adjustment process (step S4 in FIG. 9). In step S4-1, the system control unit 12 sets the initial value of the adjusted read time tx to read the output voltage Vs from the output detection circuit 24 of the first power supplying area AR (power supplying area AR selected in step S2).

The initial value of the adjusted read time tx is obtained in advance through experiments, tests, and calculations and is set at a value at which the output voltage Vs read from the output detection circuit 24 does not become greater than or equal to the second target voltage Vp2.

More specifically, the first resonance characteristic A1 differs between each power supplying area AR. Taking this into consideration, the initial value of the adjusted read time tx is set including a margin so that the output voltage Vs, which is read based on the initial value of the adjusted read time tx in each power supplying area AR, does not become greater than or equal to the second target voltage Vp2.

In step S4-2, the system control unit 12 provides the drive circuit 22 with an excitation control signal CT having the adjusted frequency fx set for the first power supplying area AR to excite and drive the primary coil L1 of the first power supplying area AR at the adjusted frequency fx.

In step S4-3, the system control unit 12 outputs the sampling signal SP and obtains the output voltage Vs based on the adjusted read time tx (here, initial value) and reads the output voltage Vs from the output detection circuit 24 of the first power supplying area AR. That is, the system control unit 12 reads the output voltage Vs from the output detection circuit 24 when the adjusted read time tx elapses after starting the exciting and driving of the primary coil L1 at the detection frequency fs.

In step S4-4, the system control unit 12 determines whether or not the output voltage Vs read at the adjusted read time tx is the second target voltage Vp2. When the output voltage Vs is not the second target voltage Vp2 (NO in step S4-4), the system control unit 12 proceeds to step S4-5.

In step S4-5, the system control unit 12 delays the present adjusted read time tx by a predetermined unit time At to set a new adjusted read time tx and returns to step S4-2.

Then, the system control unit 12 excites and drives the primary coil L1 of the first power supplying area AR again at the detection frequency fs (step S4-2). Then, the system control unit 12 outputs a sampling signal SP based on a new adjusted read time tx and reads the output voltage Vs again from the output detection circuit 24 of the first power supplying area AR (step S4-3).

The system control unit 12 determines again whether or not the output voltage Vs read at the new adjusted read time tx is the second target voltage Vp2 (step S4-4). When the output voltage Vs is not the second target voltage Vp2 (NO in step S4-4), the system control unit 12 proceeds to step 54-5. Then, the system control unit 12 further delays the present adjusted read time tx by a predetermined unit time At to set a new adjusted read time tx and returns to step S4-2.

Subsequently, the system control unit 12 repeats the processes of steps S4-2 to S4-4 until the output voltage Vs corresponding to the new adjusted read time tx reaches the second target voltage Vp2.

In step S4-4, when the output voltage Vs corresponding to the adjusted read time tx is the second target voltage Vp2 (YES in step S4-4), the system control unit 12 proceeds to step S4-6.

In step S4-6, the system control unit 12 stores the present adjusted read time tx in the memory 13 as the detection read time ts of the first power supplying area AR (basic power supplying unit circuit 4). Then, the system control unit 12 ends the read time adjustment process and proceeds to step S5 of FIG. 9.

In step S4-4, when the output voltage Vs corresponding to the present adjusted read time tx exceeds the second target voltage Vp2 but is in a predetermined tolerable range, the system control unit 12 may proceed to step S4-6. Alternatively, when the output voltage Vs corresponding to the present adjusted read time tx exceeds the second target voltage Vp2 and also exceeds the predetermined tolerable range, the system control unit 12 may proceed to step S4-6 and set the preceding adjusted read time tx as the detection read time ts.

Referring to FIG. 9, after setting the detection frequency fs and the detection read time ts for the first power supplying area AR, in step S5, the system control unit 12 increments the address counter CNT and changes the count value of the address counter CNT to "2." That is, the system control unit 12 designates the second power supplying area AR.

Then, the system control unit 12 proceeds to step S6 and determines whether or not the count value of the address counter CNT is "0." At this point of time, the count value is not "0" (NO in step S6). Thus, the system control unit 12 returns to step S2. The system control unit 12 obtains the detection frequency fs and the detection read time ts for the second power supplying area AR through the same processes as the first power supplying area AR.

Subsequently, the processes of steps S2 to S6 are repeated so that the detection frequency fs and the detection read time ts are set for each of the twenty-four power supplying areas AR and stored in the memory 13.

When the detection frequency fs and the detection read time ts for the twenty-fourth power supplying area AR is stored in the memory 13, in step S5, the system control unit 12 resets the count value of the address counter CNT, which is "24" to "0."

When determining that the count value of the address counter CNT is "0" (YES in step S6), the system control unit 12 ends the setting of the detection frequency fs and the detection read time ts for every one of the power supplying areas Ar. That is, the initial value setting mode is completed.

The initial value setting mode is performed so that by controlling the basic power supplying unit circuit 4 of each of the power supplying areas AR at the detection frequency fs and the detection read time ts when nothing is set on the power supplying areas AR, the output voltage Vs of each of the basic power supplying unit circuits 4 have the same output voltage Vs that is the second target voltage Vps.

Presence Detection Mode

The system control unit 12 sequentially and repeatedly accesses the basic power supplying unit circuits 4 of the twenty-four power supplying areas over a fixed period.

First, the system control unit 12 provides an excitation control signal CT to the drive circuit 22 of the basic power supplying unit circuit 4 in the first power supplying area AR and detects the presence of an object on the first power supplying area AR.

More specifically, the system control unit 12 provides the drive circuit 22 with the excitation control signal CT having the detection frequency fs set for the first power supplying area AR. In response to the excitation control signal CT, the drive circuit 22 excites and drives the primary coil L1 at the detection frequency fs.

Then, the system control unit 12 outputs a sampling signal SP, which is based on the detection read time ts set for the first power supplying area AR, and obtains the output voltage Vs (digital value) from the output detection circuit 24 of the first power supplying area AR. The system control unit 12 detects the presence of an object from the output voltage Vs (digital value). The presence detection is performed by comparing the output voltage Vs with two reference values, namely, a lower reference value and an upper reference value. When nothing is present on the first power supplying area AR, the output voltage Vs is the second target voltage Vp2. When the appliance E is present on the first power supplying area AR, the output voltage Vs is less than the second target voltage Vp2 and also less than or equal to the lower reference value. When metal M is present on the first power supplying area AR, the output voltage Vs is greater than the second target voltage Vp2 and also greater than or equal to the upper reference value.

Based on the principle of the presence detection described with reference to FIG. 8, when the appliance E is set, the first resonance characteristic A1 shifts to the third resonance characteristic A3. That is, the output voltage Vs, which is obtained at the detection frequency fs and the detection read time ts, becomes lower than the second target voltage Vp2. Thus, the lower reference value is set to be less than the second target voltage Vp2 at a value allowing for detection of the appliance E. The lower reference value is obtained in advance through tests or the like.

Further, when metal M is present, the first resonance characteristic A1 shifts to the second resonance characteristic A2. That is, the output voltage Vs obtained based on the detection frequency fs and the detection read time ts becomes higher than the second target voltage Vp2. Thus, the upper reference value is set to be greater than the second target voltage Vp2 at a value allowing for detection of the metal M. The upper reference value is obtained in advance through tests or the like.

Accordingly, when the output voltage Vs is between the lower reference value and the upper reference value, the system control unit 12 determines that nothing is present on the power supplying area AR.

After performing presence detection on the first power supplying area AR, the system control unit 12 performs presence detection on the second power supplying area AR.

Before performing presence detection on the second power supplying area AR, the system control unit 12 stores the presence detection result of the first power supplying area AR in a storage region of the memory 13 assigned for the first power supplying area AR.

To determine whether or not an object is present on the second power supplying area AR, the system control unit 12 provides the drive circuit 22 of the second power supplying area AR with an excitation control signal CT having the detection frequency fs set for the second power supplying area AR. In response to the excitation control signal CT, the drive circuit 22 excites and drives the primary coil L1 at the detection frequency fs.

Then, the system control unit 12 outputs a sampling signal SP, which is based on the detection read time ts set for the second power supplying area AR, and obtains the output voltage Vs (digital value) from the output detection circuit 24 of the second power supplying area AR.

In the same manner as the first power supplying area AR, the system control unit 12 performs presence detection based on the output voltage Vs (digital value) of the second power supplying area AR.

The system control unit 12 stores the presence detection result of the second power supplying area AR in a storage region of the memory 13 assigned for the second power supplying area AR. Then, the system control unit 12 performs presence detection on the third power supplying area AR.

Subsequently, the present detection is sequentially performed on the twenty-four power supplying areas AR in the same manner. When presence detection ends in the twenty-fourth power supplying area AR, the system control unit 12 returns again to the first power supplying area AR and starts the second round of control. From the second round of control, the system control unit 12 selectively performs the present detection process and the power supplying process as described below based on the presence detection result stored in the memory 13.

The system control unit 12 performs the same presence detection process as that described above from the second round of control even for power supplying areas AR determined as having nothing set thereon.

When having been determined that the appliance E is set on a power supplying area AR, from the second round of control, the system control unit 12 performs a power supplying process (power supplying mode) on the basic power supplying unit circuit 4 of that power supplying area AR.

Power Supplying Mode

When a presence detection result indicating the presence of the appliance E is stored in the memory 13, the system control unit 12 provides the drive circuit 22 of that power supplying area AR with an excitation control signal CT having the power supplying resonance frequency fp. In response to the excitation control signal CT, the drive circuit 22 excites and drives the primary coil L1 at the power supplying resonance frequency fp.

When the primary coil L1 is excited at the power supplying resonance frequency fp, magnetic flux extending through the primary coil L1 is propagated to the appliance E set on the power supplying area AR.

As a result, resonance occurs between the primary coil L1 and the secondary coil L2 of the appliance E on the power supplying area AR, and the appliance E is supplied with power at a high efficiency. The communication circuit 8b operates when supplied with power and outputs a binary signal (appliance authentication signal ID and excitation request signal RQ). This amplitude-modulates the secondary current of the power supply resonance frequency fp flowing through the secondary coil L2, and the magnetic flux of the secondary current of the amplitude-modulated frequency fp is propagated as a transmission signal to the primary coil L1.

The signal extraction circuit 25 receives the transmission signal (amplitude-modulated signal), which has been propagated to the primary coil L1 via the current detection circuit 23. The signal extraction circuit 25 determines whether or not the transmission signal includes the appliance authentication signal ID and the excitation request signal RQ. When the appliance authentication signal ID and the excitation request signal RQ are included, the signal extraction circuit 25 provides the system control unit 12 with an enable signal EN. In response to the enable signal EN, the system control unit 12 sends an excitation control signal CT having the power supplying resonance frequency fp to the drive circuit 22. In response to the excitation control signal CT, the drive circuit 22 excites and drives the primary coil L1 at the power supplying resonance frequency fp. Accordingly, the appliance E is supplied with power for a certain period.

When the certain period ends, the system control unit 12 proceeds to the control of the basic power supplying unit circuit 4 in the next power supplying area AR while continuing to excite and drive the primary coil L1 and periodically check the appliance authentication signal ID (enable signal EN) from the appliance E.

Before proceeding to the control of the basic power supplying unit circuit 4 in the next power supplying area AR, with regard to the present power supplying area AR, the system control unit 12 stores information in the corresponding storage region of the memory 13 indicating that the appliance E is present in the present power supplying area AR. Based on the information, when control is performed on the present power supplying area AR the next time, the system control unit 12 provides the drive circuit 22 with the excitation control signal CT having the power supplying resonance frequency fp and continues to supply power to the appliance E on the power supplying area AR.

If the appliance authentication signal ID (enable signal EN) is lost when continuously exciting and driving the primary coil L1, the system control unit 12 stops exciting and driving the primary coil L1, that is, stops supplying power.

Further, the signal extraction circuit 25 does not provide the system control unit 12 with the enable signal EN when one or both of the appliance authentication signal ID and the excitation request signal RQ do not exist. In this case, the system control unit 12 does not provide the drive circuit 22 with the excitation control signal CT having the power supplying resonance frequency fp. As a result, the drive circuit 22 stops exciting and driving the primary coil L1, that is, stops supplying power.

With regard to a power supplying area AR determined as having metal M set thereon, from the second round of control, the system control unit 12 does not provide the drive circuit 22 with an excitation control signal CT. That is, when the presence detection result stored in the memory 13 indicates that metal M is present, the system control unit 12 shifts the corresponding power supplying area AR to a suspension state. Then, the system control unit 12 proceeds to the control of the basic power supplying unit circuit 4 of the next power supplying area AR.

Before proceeding to the control of the basic power supplying unit circuit 4 of the next power supplying area AR, the system control unit 12 stores information, which indicates that metal M has been detected in the present power supplying area AR, in the corresponding storage region of the memory 13. This prepares the system control unit 12 for the next control.

With regard to the power supply area AR that been shifted to the suspension state based on the information indicating that metal M has been detected, the system control unit 12 performs the presence detection mode again after a predetermined time elapses from when metal was first detected or after repeating control for a predetermined number of times on the same power supplying area.

The above embodiment has the advantages described below.

(1) Even when the first resonance characteristic A1 of the primary coil L1 differs between power supplying areas AR, the system control unit 12 controls the operation of the basic power supplying unit circuit 4 for each power supplying area AR so that the presence of an object (appliance E or metal M) is detected under the same conditions.

Accordingly, even when the inductance varies between the primary coils L1 or the capacitance varies between the capacitors C1 due to product differences resulting from manufacturing variations and the like or wear over time, that is, even when the first resonance characteristic A1 differs between the power supplying areas AR, the presence detection conditions are the same in each power supplying area AR, and presence detection may be accurately performed.

(2) The first resonance characteristic A1 differs between each power supplying area AR due to product differences or the like between the primary coils L1 and between the resonance capacitors C1. Thus, the detection frequency fs that excites the primary coil L1 for presence detection is set for each power supplying area AR so that presence detection is performed under the same condition. Accordingly, even when the first resonance characteristic A1 differs for each power supplying area AR, the presence detection condition is the same for each power supplying area AR, and presence detection may be accurately performed.

In addition, the detection read time ts is set for each power supplying area AR and the output voltage Vs of the primary coil L1 is read based on the detection read time ts so that the presence detection conditions are further uniform. Accordingly, even when the first resonance characteristic A1 differs between each power supplying area due to product differences or the like between the primary coils L1 and between the resonance capacitors C1, the presence detection conditions become further uniform in the power supplying areas AR, and presence detection may be performed with higher accuracy.

(3) The first target voltage Vp1 of each power supplying area AR is set to a smaller value than the voltage corresponding to the resonance frequency fr of the first resonance characteristic A1. In the initial value setting mode, the system control unit 12 subtracts the unit frequency $\Delta f$ from the adjusted frequency fx to set a new adjusted frequency fx and determines whether or not the new adjusted frequency fx conforms to the first target voltage Vp1 (or is in tolerable range) to determine the detected frequency fs of each power supplying area AR.

In this manner, just by monotonously decreasing the adjusted frequency fx based on the first resonance characteristic A1 of each power supplying area AR, the detection frequency fs that is suitable for the first resonance characteristic A1 of each power supplying area AR may be easily set.

In addition, the system control unit 12 subtracts the unit frequency $\Delta f$ from the adjusted frequency fx to set a new adjusted frequency fx and increases the output voltage Vs corresponding to the new adjusted frequency fx from the output voltage Vs corresponding to the previous adjusted frequency fx so that the output voltage Vs gradually approaches the first target voltage Vp1. In this manner, the system control unit 12 updates the adjusted frequency fx while monitoring the increased value of the output voltage Vs. Accordingly, operation of the basic power supplying unit circuit 4 of each power supplying area AR under different conditions is limited. This limits the flow of through current to the first and second power transistors Qa and Qb.

(4) In the initial value setting mode, the system control unit 12 adds the unit time At to the adjusted read time tx and sets a new adjusted read time tx. When the output voltage Vs read based on the new adjusted read time tx reaches the second target voltage Vp2, the system control unit 12 sets the adjusted read time tx to the detection read time ts.

Accordingly, just by monotonously increasing the adjusted read time tx based on the first resonance characteristic A1 of each power supplying area AR, the detection read time ts that is suitable for the first resonance characteristic A1 of each power supplying area AR may be easily set.

The above embodiment may be modified as described below.

In the above embodiment, the system control unit 12 performs the initial value setting mode when the adjustment switch (not shown) is operated before the power supplying device 1 is shipped from the factory. Instead, for example, the system control unit 12 may perform the initial value setting mode when the power switch of the power supplying device 1 is operated. Alternatively, the system control unit 12 may perform the initial value setting mode when a predetermined time elapses from when a power switch (not shown) is operated to activate the power supplying device 1. As another option, after the power supplying device 1 is activated, the system control unit 12 may periodically perform the initial value setting mode and periodically update the detection frequency fs and the detection read time ts.

As a result, for example, when the usage environment changes, the optimal detection frequency fs and the optimal detection read time ts are set. This maintains a higher accuracy for the presence detection.

In the above embodiment, when processing the initial value setting mode based on the flowchart shown in FIGS. 9 to 11, whenever the detection frequency fs and the detection read time ts are set for each power supplying area AR, the detection frequency fs and the detection read time ts are stored in the memory 13.

For example, when a previous detection frequency fs and a previous detection read time ts are already stored in the memory 13, the system control unit 12 may compare the previous detection frequency fs and the previous detection read time ts with a new detection frequency fs and a new detection read time ts. When the value of the comparison difference (difference between previous result and new result) does not exceed the predetermined range (noise amount), the system control unit 12 may perform presence detection with the previous result (previous detection frequency fs and previous read time ts) instead of rewriting the new result over the previous result.

The predetermined range corresponds to the amount of noise that may be produced in the basic power supplying unit circuit 4 due to the circuit operation, the circuit substrate layout, or the like. The noise amount may be obtained in advance. More specifically, when the comparison difference value is within the range of the noise amount that can be assumed in advance, the system control unit 12 determines that the new detection frequency fs and the new detection read time ts result from noise and does not perform rewriting.

This eliminates unnecessary writing to the memory 13 and reduces the number of times rewriting is performed. Thus, unnecessary operations are reduced, and the life of the memory 13 is prolonged since there is a limit to the number of rewrites.

In the above embodiment, when processing the initial value setting mode in accordance with the flowchart shown in FIGS. 9 to 11, the detection frequency fs and the detection read time ts are determined for each power supplying area AR.

However, in the frequency adjustment process and the read time adjustment process, the detection frequency fs and the detection read time ts may not be ultimately determined no matter how often the adjusted frequency fx and the adjusted read time tx are changed. In this case, the system control unit 12 determines that the basic power supplying unit circuit 4 including the primary coil L1 and the resonance capacitor C1 in the power supplying area AR is defective, and the determination result may be used for product inspection of the power supplying device 1.

In this case, for example, when a new adjusted frequency fx set in step 3-5 of FIG. 10 reaches a predetermined frequency or when the adjusted number of times (repeated number of times in step S3-5) reaches a predetermined number of times, the system control unit 12 may stop setting the detection frequency fs.

Further, for example, when the new adjusted read time set in step 4-5 of FIG. 11 reaches a predetermined time or when the adjusted number of times (repeated number of times in step S4-5) reaches a predetermined number of times, the system control unit 12 may stop setting the detection read time ts.

In such a modified example, when determining that the basic power supplying unit circuit 4 is defective, the system control unit 12 may show a warning on a display (not shown) of the power supplying device 1 or show the number of the defective power supplying area AR.

In the above embodiment, the system control unit 12 uses the detection read time ts set for each power supplying area AR as the timing for reading the output voltage Vs in the presence detection mode. Instead, the system control unit 12 may use the detection read time ts as the excitation time when continuously exciting the primary coil L1 at the detection frequency fs. In this case, for example, the system control unit 12 may perform presence detection by detecting the peak value of the output voltage Vs obtained by exciting the primary coil L1 at the excitation time.

In the above embodiment, as shown in FIG. 7, in the read time adjustment process performed in the initial value setting mode, the system control unit 12 outputs the drive signals PSa and PSb from the drive circuit 22 over a fixed period and obtains the detection read time ts by acquiring the output voltage Vs that rises in the saturated region Z2. Instead, the system control unit 12 may control the drive circuit 22 by, for example, gradually increasing the pulse number of the drive signals PSa and PSb during the output period of the drive signals PSa and PSb. In this case, the system control unit 12 may set the output period of the drive signals PSa and PSb when the output voltage Vs reaches the second target voltage Vp2, that is, the oscillation period of the drive circuit 22, as the excitation time for each power supplying area AR (primary coil L1). In this configuration, in the presence detection mode, the system control unit 12 excites the primary coil L1 at the detection frequency fs over the excitation time optimized for each power supplying area AR. Accordingly, the same advantages as the above embodiment may be obtained.

In the above embodiment, the system control unit 12 performs both of the frequency adjustment process and the read time adjustment process in the initial value setting mode. Instead, the system control unit 12 may eliminate the read time adjustment process and perform only the frequency adjustment process in the initial value setting mode. In this case, the information of the detection frequency fs for each power supplying area AR is stored in the memory 13, and the information of the detection read time ts is omitted. Further, in this case, for example, the read time used in step S3-3 of the frequency adjustment process in the above embodiment is used as the timing (read time) for reading the output voltage Vs of the primary coil L1 excited and driven at the detection frequency fs.

In the above embodiment, the read time of the output voltage Vs obtained at the adjustment frequency fx is set at a timing when the waveform of the output voltage Vs changes to the saturated region Z2 in the frequency adjustment process performed in the initial value setting mode. Instead, the read time of the output voltage Vs may be set when the waveform of the output voltage Vs is in the non-saturated region Z1 before reaching the saturated region Z2. The read time in this modified example will hereafter be referred to as the non-saturated region read time.

The waveform of the output voltage Vs in the non-saturated region Z1 changes when the inductance varies between the primary coils L1 and the capacitance varies between the resonance capacitors C1. This changes the timing at which the saturated region Z2 is reached. Accordingly, the non-saturated region read time is set in advance with a margin by taking into consideration the time in which the waveform of the output voltage Vs of each power supplying area AR exists in the non-saturated region Z1.

In the modified example, the system control unit 12 samples and reads the output voltage Vs of the primary coil L1 at the non-saturated region read time that is in accordance with the power supplying area AR. Further, the system control unit 12 adjusts the adjusted frequency fs that conforms to the first target voltage Vp1 to obtain the detection frequency fs.

The output voltage Vs in the non-saturated region Z1 greatly changes even when the change in the adjusted frequency fx is slight. Thus, a target voltage range having a predetermined tolerable width may be used in lieu of the first target voltage Vp1. In this case, the present adjusted frequency fx may be set as the detection frequency fs as long as the output voltage Vs sampled at the non-saturated region time is in the target voltage range, which includes the first target voltage Vp1.

Then, in the read time adjustment process, the system control unit 12 uses the detection frequency fs obtained in the above process to obtain the detection read time ts. In the above embodiment, the initial value of the adjustment read time tx prepared in advance through experiments or the like is set in step S4-1. Instead, in this modified example, the system control unit 12 sets the non-saturated region read time as the initial value of the adjusted read time tx and reads the first output voltage Vs based on the non-saturated region read time.

Then, in the same manner as in the above embodiment, the system control unit 12 sequentially updates the adjusted read time tx and compares the presently read output voltage Vs with the second target voltage Vp2.

Accordingly, the non-saturated region read time used in the frequency adjustment process is set as the initial value of the adjusted read time tx. Thus, when shifting from the frequency adjustment process to the read time adjustment process, the read time has continuity.

When the non-saturated region read time is set to the initial value of the adjusted read time tx and a predetermined target voltage range is used instead of the first target voltage Vp1 in the previous frequency adjustment process, the output voltage Vs read at the adjusted read time tx is generated as a value that is greater than or less than the second target voltage Vp2. Accordingly, when setting a new adjusted read time tx, it is desirable that the system control unit 12 subtract or add the unit time Δt from or to the present adjusted read time tx so that the output voltage Vs approaches the second target voltage Vp2. As a result, the detection read time ts at which the second target voltage Vp2 can be read may be narrowed down with high accuracy.

In this manner, the non-saturated region read time set in the frequency adjustment process is used as an initial value of the adjusted read time tx in the read time adjustment process. Accordingly, when shifting from the frequency adjustment process to the read time adjustment process, the continuity of the read time is maintained. This facilitates control in the initial value setting mode and shortens the adjustment process time in the initial value setting mode.

The read time adjustment process may also be omitted in this case so that only the frequency adjustment process is performed.

In the above embodiment, the product differences between the primary coils L1 and between the resonance capacitors C1 in the power supplying areas AR cause differences in the waveform of the non-saturated region Z1 in the output voltage Vs. Focusing on the waveform difference in the non-saturated region Z1, the detection read time ts is obtained using the detection frequency fs and the adjusted read time tx so that the output voltage Vs of each power supplying area AR all become the second target voltage Vp2 in the read time adjustment process.

Instead, for example, the system control unit 12 may adjust the duty ratio (i.e., pulse width) of the drive signals PSa and PSb provided to the half-bridge circuit 21. This allows the same output voltage Vs to be detected even when the waveform of the output voltage Vs differs due to product differences between the primary coils L1 and between the resonance capacitors C1 in the power supplying areas AR.

For example, the system control unit 12 obtains the detection frequency fs for each power supplying area AR using the non-saturated region read time obtained in the frequency adjustment process of the above embodiment.

Then, the system control unit 12 adjusts the duty ratio (adjusted duty ratio) of the drive signals PSa and PSb that drive the half-bridge circuit 21 of each power supplying area AR by predetermined unit duty ratios. For example, the system control unit 12 provides the drive circuit 22 of the basic power supplying unit circuit 4 with an excitation control signal CT that controls the adjusted duty ratio. The system control unit 12 reads the output voltage Vs, which is obtained using the adjusted duty ratio, based on, for example, the non-saturated region read time to compare the output voltage Vs with the second target voltage Vp2. The system control unit 12 sets the detection duty ratio to the duty ratio of the drive signals PSa and PSb used when the output voltage Vs reached the second target voltage Vp2. The system control unit 12 obtains such a detection duty ratio for each power supplying area AR and stores the duty ratio in the corresponding storage region of the memory 13. In this modified example, the system control unit 12 (detection condition changing circuit) functions as a detection duty ratio changing circuit. More specifically, the detection duty ratio changing circuit functionally includes a duty ratio adjustment circuit, which adjusts the detection duty ratio using the adjusted duty ratio, a comparison circuit, which compares the output voltage Vs obtained from the adjusted duty ratio and the detection frequency fs with a predetermined target voltage, and a setting circuit, which determines the detection duty ratio based on the comparison result of the comparison circuit.

In the presence detection mode, based on the non-saturated region read time, the system control unit 12 reads the output voltage Vs, which is obtained by exciting the primary coil L1 using the detection frequency fs and the detection duty ratio that correspond to the power supplying area AR. As a result, each power supplying area AR is operated under the same conditions during the presence detection. Accordingly, the presence detection conditions are the same in the power supplying areas AR and presence detection can be accurately performed even when product differences, such as manufacturing variations, or wear over time varies the inductance between the primary coils L1 or varies the capacitance between the resonance capacitors C1, that is, cause differences in the first resonance characteristic A1 between the power supplying areas AR.

The system control unit 12 may further perform the read time adjustment process after obtaining the detection duty ratio for each power supplying area AR. In this case, the system control unit 12 compares the output voltage Vs, which is obtained by exciting the primary coil L1 using the detection frequency fs and the detection duty ratio, with the target voltage (may be second target voltage Vp2), and sets the detection read time ts to the read time (i.e., adjusted read time tx) used when the output voltage Vs reached the target voltage.

For example, in the same manner as described above, the system control unit 12 sets the non-saturated read time as the initial value of the adjusted read time tx and then sequentially changes the adjusted read time tx. Then, the system control unit 12 stores the adjusted read time tx, which was used when the output voltage Vs reached the target voltage, in the memory 13 as the detection read time ts.

In this modified example, the half-bridge circuit 21 is driven based on the drive signals PSa and PSb having the detection duty ratio. The high-frequency current of the detection frequency fs generated by the half-bridge circuit 21 excites the primary coil L1. Further, the output voltage Vs is read based on the detection read time ts. This enables presence detection to be performed with higher accuracy.

As described above, the initial value setting mode is periodically repeated. In this case, the system control unit 12 updates the detection duty ratio stored in the memory 13 for each power supplying area AR. Here, in the same manner as described above, when the comparison difference value between the new detection duty ratio, which is to be used for updating, and the previous detection duty ratio, which is stored in the memory 13, is within a predetermined range (noise amount), the system control unit 12 may perform presence detection with the previous detection duty ratio instead of rewriting the memory 13 with a new detection duty ratio.

As described above, this eliminates unnecessary writing to the memory 13 and reduces the number of times rewriting is performed. Thus, unnecessary operations are reduced, and the life of the memory 13 is prolonged since there is a limit to the number of rewrites.

Further, the system control unit 12 may adjust the DC voltage Vdd applied to the half-bridge circuit 21. This allows the same output voltage Vs to be detected even when the waveform of the output voltage Vs differs due to product differences between the primary coils L1 and between the resonance capacitors C1 in the power supplying areas AR.

For example, the system control unit 12 obtains the detection frequency fs for each power supplying area AR using the non-saturated region read time obtained in the frequency adjustment process of the above embodiment. Then, the system control unit 12 adjusts the DC voltage Vdd (adjusted DC voltage) applied to the half-bridge circuit 21 of each power supplying area AR by predetermined unit DC voltages. The system control unit 12 reads the output voltage Vs, which is obtained using the adjusted DC voltage, based on, for example, the non-saturated region read time to compare the output voltage Vs with the second target voltage Vp2. The system control unit 12 sets the detection DC voltage to the adjusted DC voltage used when the output voltage Vs reached the second target voltage Vp2. The system control unit 12 obtains such a detection DC voltage for each power supplying area AR and stores the DC voltage in the corresponding storage region of the memory 13. In this modified example, the system control unit 12 (detection condition changing circuit) functions as a detection DC voltage changing circuit. More specifically, the detection DC voltage changing circuit functionally includes a DC voltage adjustment circuit, which adjusts the detection DC voltage using the adjusted duty ratio, a comparison circuit, which compares the output voltage Vs obtained from the adjusted DC voltage and the detection frequency fs with a predetermined target voltage, and a setting circuit, which determines the detection DC voltage based on the comparison result of the comparison circuit.

In the presence detection mode, based on the non-saturated region read time, the system control unit 12 reads the output voltage Vs, which is obtained by exciting the primary coil L1 using the detection DC voltage and the detection frequency fs that correspond to the power supplying area AR. As a result, each power supplying area AR is operated under the same conditions during the presence detection. Accordingly, the presence detection conditions are the same in the power supplying areas AR and presence detection can be accurately performed even when product differences, such as manufacturing variations, or wear over time varies the inductance between the primary coils L1 or varies the capacitance between the resonance capacitors C1, that is, cause differences in the first resonance characteristic A1 between the power supplying areas AR.

As a means for changing the DC voltage Vdd (adjusted DC voltage), for example, a voltage conversion circuit such as a back converter may be arranged between the power circuit 11 and the half-bridge circuit 21 of each basic power supplying unit circuit 4. In this configuration, the system control unit 12 provides each voltage conversion circuit with a voltage control signal and controls the adjusted DC voltage.

After obtaining the detection DC voltage for each power supplying area AR, the system control unit 12 may further perform the read time adjustment process. In this case, the system control unit 12 compares the output voltage Vs, which is obtained by exciting the primary coil L1 using the detection DC voltage and the detection frequency fs, with the target voltage (i.e., second target voltage Vp2) to set the detection read time ts to the read time (i.e., adjusted read time tx) used when the output voltage Vs reaches the target voltage.

For example, in the same manner as described above, the system control unit 12 sets the non-saturated region read time to the initial value of the adjusted read time tx and then sequentially changes the adjusted read time tx. Further, the system control unit 12 stores the adjusted read time used when the output voltage Vs reaches the target voltage to the memory as the detection read time ts.

In this modified example, the detection DC voltage is applied to the half-bridge circuit 21 for each power supplying area AR, and the high-frequency current of the detection frequency fs generated by the half-bridge circuit excites the primary coil L1. Further, the output voltage Vs is read based on the detection read time ts. As a result, presence detection may be performed with a higher accuracy.

As described above, the initial value setting mode is periodically repeated. In this case, the system control unit 12 updates the detection DC voltage stored in the memory 13 for each power supplying area AR. Here, in the same manner as described above, when the comparison difference value between the new detection DC voltage, which is to be used for updating, and the previous detection DC voltage, which is stored in the memory 13, is within a predetermined range (noise amount), the system control unit 12 may perform presence detection with the previous detection DC voltage instead of rewriting the memory 13 with a new detection DC voltage.

As described above, this eliminates unnecessary writing to the memory 13 and reduces the number of times rewriting is performed. Thus, unnecessary operations are reduced, and the life of the memory 13 is prolonged since there is a limit to the number of rewrites.

In the above embodiment, the output detection circuit 24, which is connected to the current detection circuit 23, obtains the current detection signal SG1 of the primary coil flowing through the primary coil L1 from the current detection circuit 23. Instead of the current detection circuit 23, a voltage detection circuit may be used to detect the voltage of the primary coil L1, and the voltage detection circuit may provide the output detection circuit 24 with a detection circuit.

In the above embodiment, the number of the power supplying areas AR (basic power supplying unit circuits 4) in the power supplying device 1 is twenty-four but may be any number. That is, the setting surface 1 of the power supplying device 1 may include only a single power supplying area AT. In this case, the power supplying device 1 may also have a high detection sensitivity and be provided with a presence detection function having a uniform standard. That is, variations in the resonance characteristics are reduced between power supplying devices 1, and each power supplying device 1 has the same presence detection accuracy.

In the above embodiment, the shapes of the primary coils L1 and the secondary coil L2 are tetragonal but do not have to be so and may have any other shape, such as that of a polygon, other than a tetragon, or a round shape. Further, the primary coils L1 and the secondary coil L2 are not particularly limited in size. For example, the size of the primary coils L1 may differ from the size of the secondary coil L2.

In the above embodiment, each primary coil L1 is used as a power supplying coil for supplying power to the appliance E in addition to being used as a detection coil for performing presence detection. However, the primary coil L1 may be used as a detection coil used only for presence detection. In other words, a separate power supplying coil may be provided to supply power to the appliance E.

The invention claimed is:

1. A wireless power transmission device that performs wireless power supplying on a power reception device arranged in an electric appliance using an electromagnetic induction effect, the wireless power transmission device comprising:
   a detection coil;
   a capacitor that configures a resonance circuit with the detection coil;
   an oscillation circuit configured to excite the detection coil with high-frequency current, wherein the oscillation circuit is capable of generating high-frequency current corresponding to a detection frequency for performing presence detection of the electric appliance and metal;
   an output detection circuit configured to generate output voltage in accordance with excitation current flowing through the detection coil;
   a presence detection circuit configured to perform presence detection of the electric appliance and the metal based on the output voltage obtained by exciting the detection coil with the high-frequency current having the detection frequency; and
   a detection condition changing circuit that is capable of performing an initial value setting mode that changes a detection condition of the presence detection circuit in accordance with a resonance characteristic determined by the detection coil and the capacitor so that the presence detection for each power supplying area is performed by the presence detection circuit under the same condition,
   wherein the detection condition changing circuit includes a detection frequency changing circuit configured to change the detection frequency in accordance with the resonance characteristic.

2. The wireless power transmission device according to claim 1, wherein
   the detection coil is a primary coil;
   the oscillation circuit is further capable of generating high-frequency current corresponding to a power supplying resonance frequency, which differs from the detection frequency, and performing wireless power supplying from the primary coil excited by the high-frequency current having the power supplying resonance frequency to a secondary coil of the power reception device using an electromagnetic induction effect.

3. The wireless power transmission device according to claim 1, further comprising a setting surface on which the electric appliance is set, wherein
   the setting surface is divided into one or more areas, and the detection coil is arranged in each area.

4. The wireless power transmission device according to claim 1, wherein the detection frequency changing circuit includes
   a frequency adjustment circuit configured to provide the oscillation circuit with a control signal for controlling an adjusted frequency for adjusting the detection frequency;
   a first comparison circuit configured to compare the output voltage, which is obtained by exciting the detection coil with high-frequency current having the adjusted frequency and generated by the oscillation circuit, with a first target voltage; and
   a first setting circuit configured to set the detection frequency to the adjusted frequency, which was used when the output voltage reached the first target voltage, based on a comparison result from the first comparison circuit.

5. The wireless power transmission device according to claim 4, wherein the frequency adjustment circuit is configured to change the adjusted frequency so that the adjusted frequency decreases step by step from a frequency higher than a resonance frequency having the resonance characteristic.

6. The wireless power transmission device according to claim 4, further comprising a memory configured to store the detection frequency, wherein
   the detection frequency changing circuit is configured to update the detection frequency stored in the memory, wherein when a comparison difference value of a new detection frequency, which is to be used for updating, and a previous detection frequency, which is stored in the memory, is in a predetermined range, the detection frequency changing circuit does not rewrite the new detection frequency over the previous detection frequency.

7. The wireless power transmission device according to claim 4, wherein
   the presence detection circuit is configured to read the output voltage, which is obtained by exciting the detection coil with the high-frequency current having the detection frequency, from the output detection circuit based on a detection read time; and
   the detection condition changing circuit further includes a detection read time changing circuit configured to change the detection read time in accordance with the resonance characteristic.

8. The wireless power transmission device according to claim 7, wherein the detection read time changing circuit includes:
   a read time adjustment circuit configured to provide the output detection circuit with a sampling signal based on an adjusted read time for adjusting the detection read time;
   a second comparison circuit configured to read the output voltage, which is obtained by exciting the detection coil with the high-frequency current having the detection frequency, in response to the sampling signal and compare the output voltage with a second target voltage; and
   a second setting circuit configured to set the detection read time to the adjusted read time used when the output voltage reaches the second target voltage, based on a comparison result from the second comparison circuit.

9. The wireless power transmission device according to claim 8, wherein the read time adjustment circuit is configured to change the adjusted read time so that the output voltage approaches the second target voltage step by step.

10. The wireless power transmission device according to claim 8, comprising a memory configured to store the detection read time, wherein
the detection read time changing circuit is configured to update the detection read time stored in the memory, wherein when a comparison difference value of a new detection read time, which is to be used for updating, and a previous detection read time, which is stored in the memory, is in a predetermined range, the detection read time changing circuit does not rewrite the new detection read time over the previous detection read time.

11. The wireless power transmission device according to claim 4, wherein
the presence detection circuit is configured to drive the oscillation circuit with a pulse drive signal corresponding to a detection duty ratio and generate the high-frequency current having the detection frequency, and
the detection condition changing circuit further includes a detection duty ratio changing circuit configured to change the detection duty ratio in accordance with the resonance characteristic.

12. The wireless power transmission device according to claim 11, wherein the detection duty ratio changing circuit includes:
a duty ratio adjustment circuit configured to provide the oscillation circuit with an excitation control signal that controls an adjusted duty ratio for adjusting the detection duty ratio;
a second comparison circuit configured to read the output voltage, which is obtained by exciting the detection coil with the high-frequency current having the detection frequency generated with the adjusted duty ratio, and compare the output voltage with a second target voltage; and
a second setting circuit configured to set the detection duty ratio to the adjusted duty ratio used when the output voltage reaches the second target voltage, based on a comparison result from the second comparison circuit.

13. The wireless power transmission device according to claim 12, wherein the duty ratio adjustment circuit is configured to change the adjusted duty ratio so that the output voltage approaches the second target voltage step by step.

14. The wireless power transmission device according to claim 12, further comprising a memory configured to store the detection duty ratio, wherein
the detection duty ratio changing circuit is configured to update the detection duty ratio stored in the memory, wherein when a comparison difference value of a new detection duty ratio, which is to be used for updating, and a previous detection duty ratio, which is stored in the memory, is in a predetermined range, the detection duty ratio changing circuit does not rewrite the new detection duty ratio over the previous detection duty ratio.

15. The wireless power transmission device according to claim 4, wherein
the presence detection circuit is configured to apply a detection DC voltage to the oscillation circuit and generate high-frequency current having the detection frequency, and
the detection condition changing circuit includes a detection DC voltage changing circuit configured to change the detection DC voltage in accordance with the resonance characteristic.

16. The wireless power transmission device according to claim 15, wherein the detection DC voltage changing circuit includes:
a DC voltage adjustment circuit configured to control an adjusted DC voltage for adjusting the detection DC voltage;
a second comparison circuit configured to read the output voltage, which is obtained by exciting the detection coil with the high-frequency current having the detection frequency generated with the adjusted DC voltage, and compare the output voltage with a second target voltage; and
a second setting circuit configured to set the detection DC voltage to the adjusted DC voltage used when the output voltage reaches the second target voltage, based on a comparison result from the second comparison circuit.

17. The wireless power transmission device according to claim 16, wherein the DC voltage adjustment circuit is configured to change the adjusted DC voltage so that the output voltage approaches the second target voltage step by step.

18. The wireless power transmission device according to claim 16, comprising a memory configured to store the detection DC voltage, wherein
the detection DC voltage changing circuit is configured to update the detection DC voltage stored in the memory, wherein when a comparison difference value of a new detection DC voltage, which is to be used for updating, and a previous detection DC voltage, which is stored in the memory, is in a predetermined range, the detection DC voltage changing circuit does not rewrite the new detection DC voltage over the previous detection DC voltage.

19. The wireless power transmission device according to claim 1, wherein the presence detection circuit is configured to perform the initial value setting mode when a power switch of the wireless power transmission device is operated, when an adjustment switch that differs from the power switch is operated, or when a predetermined time elapses from when the wireless power device is activated.

20. A wireless power transmission device that performs wireless power supplying on a power reception device arranged in an electric appliance using an electromagnetic induction effect, the wireless power transmission device comprising:
a detection coil;
a capacitor that configures a resonance circuit with the detection coil;
an oscillation circuit configured to excite the detection coil with high-frequency current, wherein the oscillation circuit is capable of generating high-frequency current corresponding to a detection frequency for performing presence detection of the electric appliance and metal;

an output detection circuit configured to generate output voltage in accordance with excitation current flowing through the detection coil;

a presence detection circuit configured to perform presence detection of the electric appliance and the metal based on the output voltage obtained by exciting the detection coil with the high-frequency current having the detection frequency; and a detection condition changing circuit that is capable of performing an initial value setting mode that changes a detection condition of the presence detection circuit in accordance with a resonance characteristic determined by the detection coil and the capacitor, wherein the detection condition changing circuit includes
a detection frequency changing circuit configured to change the detection frequency in accordance with the resonance characteristic, and wherein the detection frequency changing circuit includes
a frequency adjustment circuit configured to provide the oscillation circuit with a control signal for controlling an adjusted frequency for adjusting the detection frequency;

a first comparison circuit configured to compare the output voltage, which is obtained by exciting the detection coil with high-frequency current having the adjusted frequency and generated by the oscillation circuit, with a first target voltage; and a first setting circuit configured to set the detection frequency to the adjusted frequency, which was used when the output voltage reached the first target voltage, based on a comparison result from the first comparison circuit.

* * * * *